United States Patent [19]
Kanno et al.

[11] Patent Number: 5,787,063
[45] Date of Patent: Jul. 28, 1998

[54] DISK DRIVE UNIT HAVING IMPROVED SHUTTER MECHANISM

[75] Inventors: Tetsuo Kanno, Ebina; Akihiko Okamoto, Kawasaki, both of Japan

[73] Assignee: Richoh Company, Ltd., Tokyo, Japan

[21] Appl. No.: 443,103

[22] Filed: May 17, 1995

Related U.S. Application Data

[63] Continuation-in-part of Ser. No. 118,802, Sep. 8, 1993, abandoned, and Ser. No. 236,624, Apr. 29, 1994, abandoned, which is a continuation of Ser. No. 921,300, Jul. 28, 1992, Pat. No. 5,351,228, which is a continuation-in-part of Ser. No. 747,529, Aug. 20, 1991, abandoned.

[30] Foreign Application Priority Data

| Sep. 20, 1990 | [JP] | Japan | 2-248913 |
| Apr. 18, 1991 | [JP] | Japan | 3-86732 |
| Aug. 20, 1991 | [JP] | Japan | 3-231151 |
| Sep. 8, 1992 | [JP] | Japan | 4-239540 |

[51] Int. Cl.$^6$ ............................................. G11B 33/02
[52] U.S. Cl. ............................................. 369/77.2
[58] Field of Search ........................ 369/77.1, 77.2; 360/99.02, 99.03, 99.06, 99.07, 99.5, 96.6

[56] References Cited

U.S. PATENT DOCUMENTS

| 4,096,536 | 6/1978 | Cicatelli | 360/96.5 |
| 4,339,777 | 7/1982 | Gruczelak | 360/97 |
| 4,389,717 | 6/1983 | Camerik | 369/75 |
| 4,408,321 | 10/1983 | Yamamura | 369/77.2 |
| 4,454,599 | 6/1984 | Tsuchiya | 369/77.2 |
| 4,489,356 | 12/1984 | Farmer | 360/97 |
| 4,509,158 | 4/1985 | Kang | 369/77.2 |
| 4,573,092 | 2/1986 | Sugiyama et al. | 369/77.2 |
| 4,581,668 | 4/1986 | Campbell | 360/97 |
| 4,642,715 | 2/1987 | Ende | 360/97 |
| 4,673,994 | 6/1987 | Hida | 360/85 |
| 4,675,858 | 6/1987 | d'Alayer de Costemore d'Arc | 369/77.1 |

(List continued on next page.)

FOREIGN PATENT DOCUMENTS

| 0134419 | 3/1985 | European Pat. Off. . |
| 0490049 | 6/1992 | European Pat. Off. . |
| 60-202591 | 10/1985 | Japan . |
| 61-142589 | 6/1986 | Japan . |
| 62-295291 | 12/1987 | Japan . |
| 63-293783 | 11/1988 | Japan . |
| 648546 | 1/1989 | Japan . |
| 1185840 | 7/1989 | Japan . |
| 1220172 | 9/1989 | Japan |

(List continued on next page.)

OTHER PUBLICATIONS

D.S. Gaunt and C.J. Hillary, "Cooling Electrical Equipment", Proceedings of IBM Technical Disclosure Bulletin, vol. 20, No. 6, Nov. 1977, pp. 2428–2429.

Primary Examiner—Stuart S. Levy
Assistant Examiner—Allen Cao
Attorney, Agent, or Firm—Cooper & Dunham LLP

[57] ABSTRACT

The present invention provides a disk drive unit which includes a body case having an opening portion for inserting a disk cartridge and for facilitating removal of the cartridge from the body case. A shutter mechanism having a shutter which is rotatably supported in the body case and is movable between an open position for inserting the cartridge and a closed position for preventing airborne debris from entering the interior of the body case. The shutter is normally in the closed position and is opened when a cartridge is inserted or ejected. A loading device is positioned within the body case and is configured to vertically move the cartridge so as to load the inserted cartridge onto a driving device. The loading device also selectively ejects the cartridge in an ejection movement. A driving device is provided to rotate a disk stored in the cartridge and is preferably fixed to the body case. The shutter mechanism also includes a cam linked with the shutter which is provided to rotate or pivot the shutter upwardly in association with the ejection movement of the cartridge caused by the loading device so as cause the shutter to move to the open position when the cartridge is being ejected.

16 Claims, 32 Drawing Sheet

U.S. PATENT DOCUMENTS

| | | | |
|---|---|---|---|
| 4,691,257 | 9/1987 | Taguchi | 369/77.2 |
| 4,692,827 | 9/1987 | Biermeier et al. | 360/97 |
| 4,723,185 | 2/1988 | Maeda | 360/97 |
| 4,725,904 | 2/1988 | Dalziel | 360/97 |
| 4,727,444 | 2/1988 | Fukushima et al. | 360/97 |
| 4,736,356 | 4/1988 | Konshak | 369/77.2 |
| 4,743,991 | 5/1988 | Akiyama | 369/77.2 |
| 4,771,412 | 9/1988 | Aihara et al. | 369/75.1 |
| 4,780,776 | 10/1988 | Dushkes | 360/98 |
| 4,785,365 | 11/1988 | Ohkita | 360/97 |
| 4,815,065 | 3/1989 | Rouws | 369/77.2 |
| 4,816,945 | 3/1989 | Watanabe | 360/99.07 |
| 4,829,393 | 5/1989 | Shimizu et al. | 360/99.07 |
| 4,829,504 | 5/1989 | Sunaga et al. | 369/75.2 |
| 4,847,711 | 7/1989 | Inoue | 369/72 |
| 4,866,693 | 9/1989 | Odawara et al. | 369/75.2 |
| 4,878,138 | 10/1989 | Ando et al. | 360/99.02 |
| 4,882,722 | 11/1989 | Matsuura et al. | 369/75.2 |
| 5,060,101 | 10/1991 | Isomura | 360/99.06 |
| 5,086,422 | 2/1992 | Hagiya et al. | 369/75.1 |
| 5,091,898 | 2/1992 | Bessho et al. | 360/99.06 |
| 5,105,317 | 4/1992 | Sugiyama et al. | 360/96.5 |
| 5,172,362 | 12/1992 | Hattori et al. | 369/77.2 |
| 5,231,623 | 7/1993 | Kanno et al. | 369/75.2 |
| 5,351,228 | 9/1994 | Kanno et al. | 369/77.2 s |

FOREIGN PATENT DOCUMENTS

| | | |
|---|---|---|
| 2-89249 | 3/1990 | Japan . |
| 2134761 | 5/1990 | Japan . |
| 2-27757 | 6/1990 | Japan . |
| 2239494 | 9/1990 | Japan . |
| 4-13263 | 1/1992 | Japan . |

DISK DRIVE UNIT HAVING IMPROVED SHUTTER MECHANISM

CROSS REFERENCE TO RELATED APPLICATIONS

This application is a continuation-in-part of Ser. No. 08/118,802 filed Sep. 8, 1993, now abandoned, and a continuation-in-part of Ser. No. 08/236,624, filed Apr. 29, 1994, now abandoned, which is a continuation of Ser. No. 07/921,300, filed Jul. 28, 1992 now U.S. Pat. No. 5,351,228, which is a continuation-in-part of Ser. No. 07/747,529, filed Aug. 20, 1991, now abandoned, all of which are incorporated herein by reference.

BACKGROUND OF THE INVENTION

1. Field of the Invention

The present invention generally relates to recording-regenerative apparatus with an improved mechanism for opening and closing an access door to the apparatus. More particularly, the present invention relates to a shutter opening-closing mechanism for a cartridge-type recording-regenerative apparatus, such as an optical disk cartridge apparatus, a magneto-optic disk cartridge apparatus, and the like.

2. Description of the Related Art

In a recording-regenerative apparatus using a cartridge having a recording medium stored therein, airborne debris, such as dust and the like, flows into the interior of the apparatus, even when the cartridge is inserted into an insertion port of the apparatus body. This occurs because the insertion port is left open even while in the cartridge is in the apparatus. As a result of the dust flowing into the apparatus, the recording-regenerative apparatus may malfunction and errors in recording or regeneration may arise.

One attempt to solve this problem is to provide a shutter for opening and closing the insertion port in the cartridge-type recording-regenerative apparatus. However, in current shutter configurations, the shutter is opened and closed by a general shutter opening-closing mechanism which remains open when the cartridge is inserted. When the cartridge is inserted into the insertion port, the shutter pivots or rotates upwardly to an open position to permit access to the interior of the apparatus. However, with the cartridge in the interior portion of the apparatus, the shutter cannot be rotated or pivoted downwardly to a closed position because the shutter engages an upper face of the cartridge. Therefore, in order for current recording-regenerative apparatus to close the shutter after insertion of the cartridge it is necessary to increase the distance the cartridge is inserted into the apparatus body. This distance is based on a length from a center of rotation of the shutter to the rotating end of the shutter. However, by increasing the distance the cartridge must be inserted into the apparatus it is necessary to adjust the positioning of a spindle motor unit for rotating a disk in the cartridge. As a result, the size, cost and weight of the recording-regenerative apparatus is increased.

Therefore, a need exists for a shutter opening-closing mechanism which maintains the shutter in a closed position even when a cartridge is inserted into the apparatus and which minimizes the size, weight and cost of the apparatus.

SUMMARY OF THE INVENTION

The present invention provides a disk drive unit which includes a body case having an opening portion for inserting a disk cartridge and for facilitating removal of the cartridge from the body case. A shutter mechanism having a shutter which is rotatably supported in the body case and is movable between an open position for inserting the cartridge and a closed position for preventing airborne debris from entering the interior of the body case. The shutter is normally in the closed position and is opened when a cartridge is inserted or ejected. A loading device is positioned within the body case and is configured to vertically move the cartridge so as to load the inserted cartridge onto a driving device. The loading device also selectively ejects the cartridge in an ejection movement. A driving device is provided to rotate a disk stored in the cartridge and is preferably fixed to the body case. The shutter mechanism also includes a cam linked with the shutter which is provided to rotate or pivot the shutter upwardly in association with the ejection movement of the cartridge caused by the loading device so as cause the shutter to move to the open position when the cartridge is being ejected.

Preferably, the shutter is mounted so that a rotational center of the shutter is located on a side of the driving device within the body case, and at least one face of the shutter is formed by an arc face in a shape approximately equal to the shape of an arc around the rotational center of the shutter so as to maintain the compact size of the apparatus.

BRIEF DESCRIPTION OF THE DRAWINGS

Preferred embodiments of the invention are described hereinbelow with reference to the drawings wherein:

FIG. 51 is a perspective view illustrating the shutter mechanism of FIG. 50a;

DESCRIPTION OF THE PREFERRED EMBODIMENTS

The preferred embodiments of a shutter opening-closing mechanism, hereinafter referred to as the shutter mechanism, of a recording-regenerative apparatus in the present invention will next be described in detail with reference to the accompanying drawings. For the purpose of the present discussion, the recording-regenerative apparatus will be described as a cartridge-type disk drive unit or a disk drive unit. However, the subject matter of the present invention is not limited to disk drive units.

Figure 1:
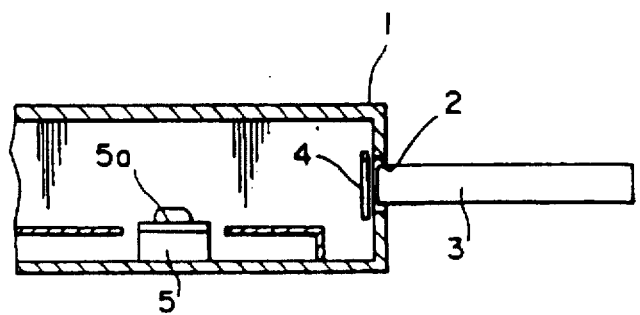
FIG. 1 is a side sectional view illustrating a schematic construction of a recording regenerative apparatus having a general shutter opening-closing mechanism.
Figure 2:
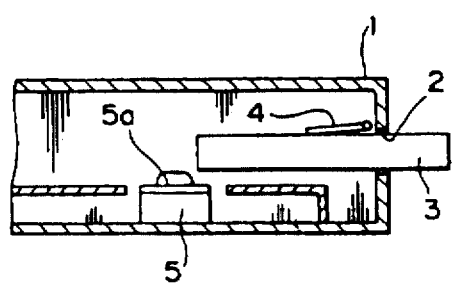
FIG. 2 is a side sectional view similar to FIG. 1 and illustrating insertion of a cartridge type disk into the recording-regenerative apparatus and the opening-closing operation of the shutter.
Figure 3:
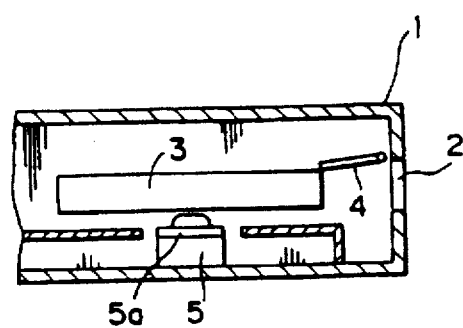
FIG. 3 is a side sectional view similar to FIG. 1 and illustrating the cartridge-type disk positioned in the recording-regenerative apparatus in an aligned position with a spindle motor.
Figure 4:
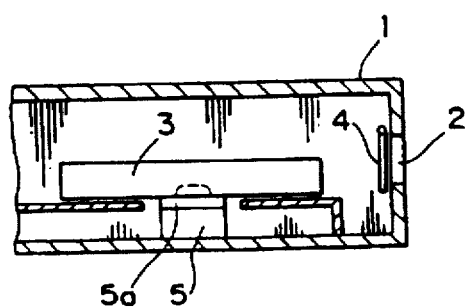
FIG. 4 is a side sectional view similar to FIG. 3 and illustrating the shutter in a closed position and the cartridge engaged with the spindle motor.

Referring to FIGS. 1–4 a schematic construction of a disk drive unit having a general shutter mechanism is shown. FIGS. 2–4 illustrate the general operation for opening and closing a shutter in the disk drive unit shown in FIG. 1. Generally the unit has a box-shaped body 1 with an insertion port 2 formed in the box-shaped body 1. The insertion port permits insertion and withdrawal of a recording-regenerative medium, such as cartridge 3. A shutter 4 is positioned adjacent the insertion port 2 and is movable between an open position, seen in FIG. 3, and a closed position, seen in FIG. 4. An upper end of the shutter 4 is rotatably supported by an inner side portion of the apparatus body 1. The shutter 4 is biased by a biasing member (not shown) toward the closed position which inhibits dust from entering of the insertion port 2. A spindle motor unit 5 has a turntable 5a which supports the cartridge 3 when the cartridge is inserted into the disk drive unit, as seen in FIG. 4.

When the cartridge 3 is inserted into the insertion port 2 from the exterior of the disk drive unit, a tip portion of the cartridge contacts the shutter 4 so as to rotate the shutter against the biasing force of the biasing member and move the shutter to the open position. A rotating end of the shutter 4 comes in contact with an upper face of the cartridge 3 and the shutter 4 is opened until the optical disk of the cartridge 3 is mounted onto the turntable 5a. The cartridge 3 is moved to a recording-regenerative (or driving) position by an loading mechanism (not shown) so that the disk cartridge is mounted onto the turntable 5a. At this time, the rotating end of the shutter 4 is separated from the upper face of the cartridge 3 and the shutter 4 is rotated by the biasing force of the biasing member to the closed position for closing the insertion port 2.

When the cartridge 3 is ejected, the shutter 4 is rotated to the open position by an unillustrated shutter opening-closing mechanism. Thereafter, the cartridge 3 is moved by the loading mechanism from the driving position to an ejecting position in which the cartridge 3 can be pulled out of the apparatus body 1. The rotating end of the shutter 4 again comes in contact with the upper face of the cartridge 3 in the ejecting position so that the shutter 4 is held in the opening position. The cartridge 3 is pulled by a user out of the body 1 of the disk drive unit from the ejecting position. At this time, the biasing force of the biasing member rotates the shutter 4 so that the shutter is held in the closed position.

However, the above described shutter 4 is opened and closed by a general shutter opening-closing mechanism. Thus, the shutter 4 cannot be rotated and moved to the closed position unless the rotating end of the shutter 4 is separated from the upper face of the cartridge 3. Therefore, as discussed above, it is necessary to increase the distance the cartridge 3 is inserted into the body 1 of the disk drive unit. This added distance makes it necessary to move the spindle motor unit 5 further away from the insertion port 2, thereby increasing the size, weight and cost of the disk drive unit.

Referring now to FIGS. 5–10, a first embodiment of the disk drive unit of the present invention having an improved shutter mechanism is shown. In FIGS. 5 to 10, members corresponding to those in FIG. 1 are designated by the same reference numerals and an explanation about these members is omitted in the following discussion.

Figure 5:
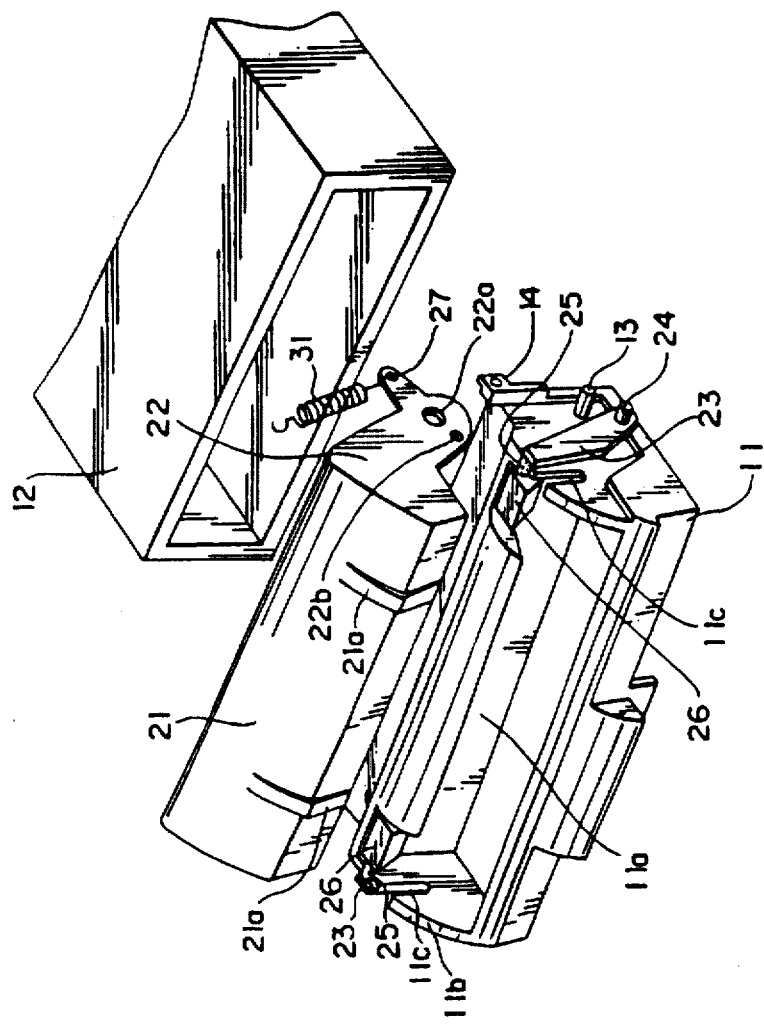
FIG. 5 is a perspective view of an apparatus body case, a body front portion and a shutter opening-closing mechanism in accordance with a first embodiment of the present invention.

As seen in FIG. 5, the disk drive unit generally includes a body case 12 having an opening therein, a body front portion 11 and a shutter mechanism which is attached to the case adjacent the opening portion. Typically, the case 12 has a box shape. An insertion port 11a configured to receive, for example, cartridge 3 is formed in the apparatus body front portion 11. An insertion port forming face 11b forming the insertion port 11a in the apparatus body front portion 11, is preferably constructed by a curved surface separated by a predetermined distance from a virtual central line of the forming face.

The shutter mechanism includes a shutter 21 which is preferably in the shape of a plate and supporting stays 22 which support the shutter 21 at both side ends thereof. The structure described hereinbelow for pivoting or otherwise moving the shutter is also part of the shutter mechanism.

A swinging shaft 13 is perpendicularly disposed on each of both sides of the apparatus body front portion 11, as seen in FIG. 5. The swinging shaft 13 is provided to inter-fit with a shaft hole 22a formed in each supporting stay 22 to permit pivotal movement of the supporting stay 22.

A supporting pin 24 is perpendicularly disposed on an outer side face of an operating rod 23 in the vicinity of one end portion of the operating rod 23. A guide pin 25 is perpendicularly disposed on an inner side face of the operating rod 23 in the vicinity of another end portion of the operating rod 23. The operating rod 23 supports a contact member 26 through the guide pin 25. The supporting pin 24 is fitted into a supporting hole 22b in the supporting stay 22 to permit pivotal movement between the supporting stay 22 and the operating rod 23. The supporting hole 22b is preferably formed in a position separated from the shaft hole 22a. The guide pin 25 is fitted into a U-shaped guide groove 11c and is formed in each side plate of the apparatus body front portion 11 and is slidable with respect thereto. Contact member 26 is supported within the apparatus body front portion 11 so that the contact member 26 is movable in a longitudinal direction of the guide groove 11c. An inner face of the shutter 21 is formed by a curved surface separated by a predetermined distance from a virtual central line of the inner face.

When the supporting stay 22 is rotated, the shutter 21 is moved along a circular locus separated from a center of the swinging shaft 13 by a distance corresponding to a length of the supporting stay 22. The shutter 21 can be moved between a closed position which closes the insertion port 11a and minimizes entry of airborne debris into the apparatus body, and an open position which opens the insertion port 11a and permits insertion or withdrawal of the cartridge 3.

Figure 6:
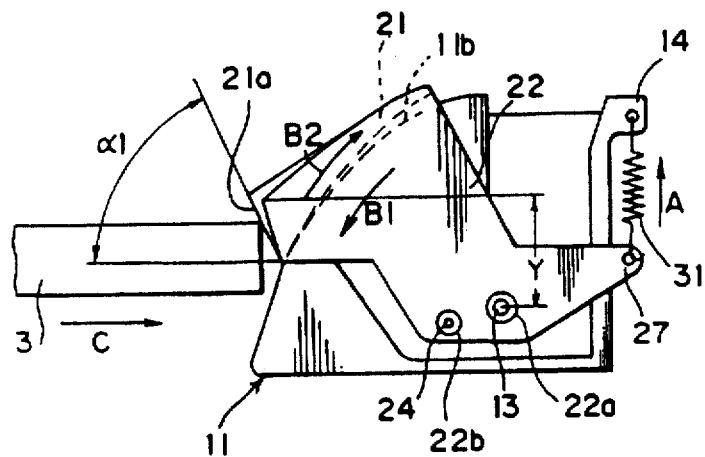
FIG. 6 is a side elevational view of the shutter opening-closing mechanism of FIG. 5.

A spring engaging portion 27 is formed in the supporting stay 22, and a spring engaging portion 14, seen in FIG. 6, is formed in the apparatus body front portion 11. One end of a spring 31 is engaged with the spring engaging portion 27 and the other end of the spring 31 is engaged with the spring engaging portion 14. In this configuration, the shutter 21 is normally biased by spring 31 through the supporting stay 22 toward the closed position.

FIG. 6 is a side view showing the shutter opening-closing mechanism in this first embodiment and the cartridge. As mentioned above, the spring 31 normally biases the shutter 21 through the supporting stay 22 in the closing direction of the shutter (i.e., toward the closed position). This closing direction is set to the direction of arrow "B1" in FIG. 6. A shutter sliding portion 21a is formed on a lower end side of the shutter 21 on an outer face thereof. Preferably, the shutter sliding portion 21a is formed in each of symmetrical positions with respect to a center of the shutter 21 in a width direction thereof, as seen in FIG. 5. The shutter sliding portion 21a has a slanting face inclined an angle $\alpha_1$ ($0° < \alpha_1 < 90°$) with respect to an inserting direction of the cartridge 3 when the shutter is in the closed position. The inserting direction of the cartridge 3 is set to the direction of arrow "C" in FIG. 6. The shutter sliding portion 21a is projected from the outer face of the shutter 21 in a convex shape. The slanting face of the shutter sliding portion 21a is narrow in the width direction of the shutter 21.

A user moves the cartridge 3 in the direction of the arrow "C" while the cartridge 3 is held at a predetermined height level. As seen in FIG. 6, the cartridge 3 first comes in contact with the shutter 21. The shutter 21 is then moved in accordance with a vertical distance "Y" from a center 13 of rotation to a contact position of the shutter 21 with respect to the cartridge 3. Thereafter, an upper end edge portion of the cartridge 3 on an inserting side thereof comes in contact with the shutter sliding portion 21a. The shutter sliding portion 21a is next pressed by this upper end edge portion of the cartridge 3. At this time, pressing force of the cartridge 3 is changed or converted by the shutter sliding portion 21a to component forces for moving the shutter 21 in an opening direction. This opening direction is set to the direction of arrow "B2" in FIG. 6. Therefore, the shutter sliding portion 21a is slidably moved with respect to the upper end edge portion of the cartridge 3 on its inserting side so that the shutter 21 is moved in the direction of arrow "B2".

Figure 7:
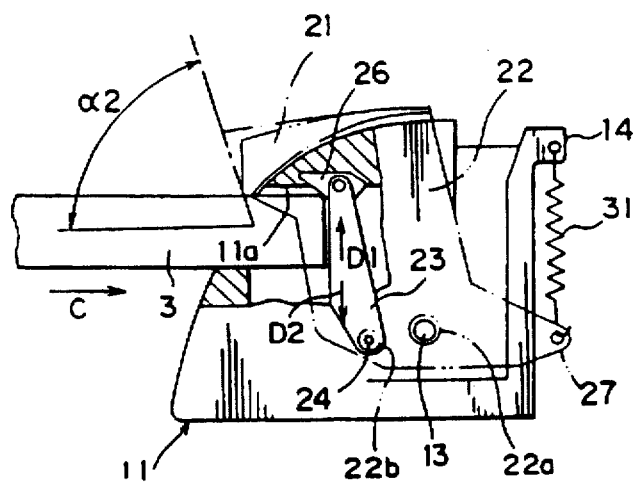
FIG. 7 is a side elevational view in partial cross-section of the shutter opening-closing mechanism of FIG. 6, illustrating the opening of the shutter during cartridge insertion.
Figure 8:
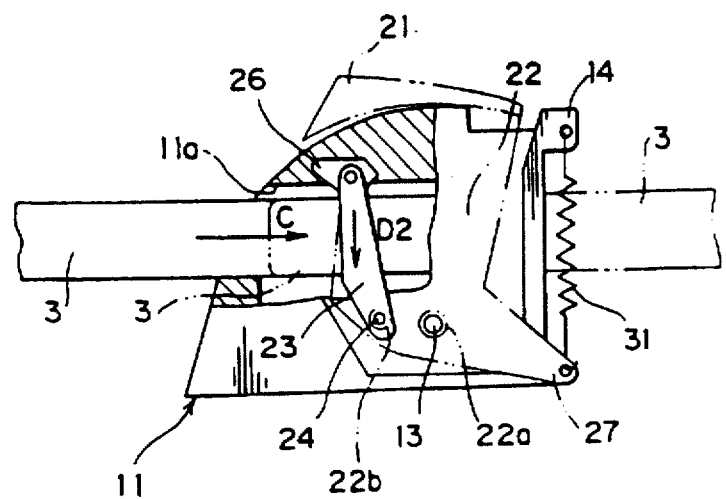
FIG. 8 is a side elevational view similar to FIG. 7, illustrating the shutter opening-closing mechanism in an open position.

Referring now to FIGS. 7 and 8 the operation of a main portion of the shutter opening-closing mechanism according to this first embodiment will be described. As shown in FIG. 7, when a user moves the cartridge 3 until a lower end portion of the shutter 21 is in conformity with an upper face of the cartridge 3 in height, the cartridge 3 is inserted into the apparatus body front portion 11 while the cartridge 3 comes in slidable contact with the lower end portion of the shutter 21. As the shutter 21 is move along a circular locus, the shutter 21 is moved in its opening direction and a slanting angle of the shutter sliding portion 21a is reduced. Force for moving the shutter 21 is constructed by moment of the shutter 21 at the distance "Y" and component force of pressing force of the cartridge 3 with respect to the shutter sliding portion 21a. If the shutter sliding portion 21a is perpendicular to the direction of the arrow "C", no pressing force of the cartridge 3 is converted to component force for opening the shutter 21 so that no user can open the shutter 21 by the cartridge 3 or it is difficult for the user to open the shutter 21.

In this first embodiment, the shutter sliding portion 21a is inclined an angle $\alpha_2$ ($0°<\alpha_1<\alpha_2<90°$) with respect to the direction of the arrow "C" in an opening position of the shutter 21 in which the lower end portion of the shutter 21 comes in contact with the upper face of the cartridge 3. Thus, the shutter 21 is smoothly moved to an arbitrary position from the closed position to the open position shown in FIG. 7 so that the cartridge 3 can be smoothly inserted into the apparatus body front portion 11. Further, frictional force caused between the cartridge 3 and the shutter 21 is reduced by the shutter sliding portion 21a having a narrow width and formed in a convex shape on the outer face of the shutter 21. Accordingly, the pressing force of the cartridge 3 is efficiently converted to force for opening the shutter 21 so that the shutter 21 can be moved toward the open position by a small pressing force of the cartridge 3. Further, if the shutter 21 is damaged by sliding the shutter 21 with respect to the cartridge 3, a damaging regional area of the shutter 21 is small so that it is possible to restrain a reduction in appearance of the shutter opening-closing mechanism when the shutter opening-closing mechanism is used for a long period.

Figure 9:
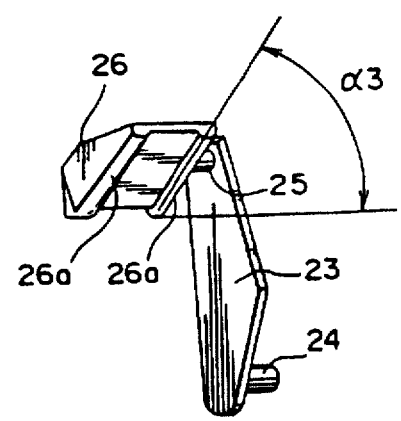
FIG. 9 is a perspective view illustrating an operating rod of the shutter opening-closing mechanism of FIG. 8.

When the cartridge 3 inserted into the apparatus body front portion 11 the cartridge contacts the contact member 26 of operating rod 23. FIG. 9 is a perspective view showing the operating rod in this first embodiment. The contact member 26 is supported by the operating rod 23 by guide pin 25 and has a contact member guide portion 26a in each of both end portions thereof. The contact member guide portion 26a is inclined an angle $\alpha_3$ ($0°<\alpha_3<90°$) with respect to the direction of the arrow "C", seen in FIG. 7. The contact member guide portion 26a is projected from the contact member 26 in a convex shape and has a narrow slanting face in a width direction. When a user moves the cartridge 3 in the direction of arrow "C", an upper end edge portion of the cartridge 3 engages the contact member guide portion 26a. At this time, pressing forces of the cartridge 3 is converted to component forces for moving the operating rod 23 along the guide groove 11c, seen in FIG. 5, in the direction of arrow "D1", seen in FIG. 7. Therefore, the contact member sliding portion 26a is slidably moved with respect to the upper end edge portion of the cartridge 3 on its inserting side. Further, the contact member sliding portion 26a moves the operating rod 23 in the direction of arrow "D1". The supporting stay 22 connected to the operating rod 23 is swung or rotated in the direction of arrow "B2", seen in FIG. 6, as the operating rod 23 is moved in the direction of arrow "D1". Thus, the shutter 21 is moved in the opening direction toward the open position. When the contact member 26 is moved onto the upper face of the cartridge 3, the shutter 21 is held by the operating rod 23 in the open position, as seen in FIG. 8.

A user then moves the cartridge 3 to a set position shown by a double-dotted chain line in FIG. 8. The cartridge 3 moved to set position, is then moved in the direction of arrow "D2" by a loading mechanism described in more detail below. As the cartridge 3 is moved, the operating rod 23 contacts the contact member 26 and a rod upper face portion is also moved in the direction of arrow "D2" so that the shutter 21 is moved in a closing direction toward the closed position. When the cartridge 3 reaches a recording-regenerative (or drive) position, the shutter 21 is returned to the closed position so that the insertion port 11a is completely closed, thereby minimizing entry of airborne debris into the apparatus body.

When the cartridge 3 is ejected, the cartridge 3 is raised from the drive position to the set position by the loading mechanism. As the cartridge 3 is raised, the supporting stays 22 are suspended by the operating rods 23 so that the shutter 21 is moved to the open position. The cartridge 3 is discharged by the loading mechanism from the set position to an ejecting position in which a rear end portion of the cartridge 3 is externally projected from insertion port 11a. At this time, the contact member 26 comes in contact with the upper face of the cartridge 3 so that the shutter 21 is held by the operating rod 23 in the open position. The cartridge 3 discharged to the ejecting position can then be removed from the disk drive unit by a user.

When the cartridge 3 is removed, a lower end portion of the shutter 21 contacts the upper face of the cartridge 3 so that the shutter 21 is held in the open position. When the cartridge 3 is completely removed from the disk drive unit, the lower end portion of the shutter 21 is disengaged from the cartridge 3 so that the shutter 21 automatically moves to the closed position by the biasing force of the spring 31.

As mentioned above, the contact member guide portion 26a formed in the contact member 26 in this first embodiment preferably has a narrow width and is inclined with respect to the inserting direction of the cartridge 3. A contact area of the contact member 26 for the upper end edge portion of the cartridge 3 on its inserting side is reduced by this contact member guide portion 26a. Accordingly, frictional force between the contact member 26 and the cartridge 3 is reduced when the contact member guide portion 26a comes in slidable contact with the cartridge 3. In this configuration, the pressing force of the cartridge 3 is efficiently converted to component forces for opening the shutter 21. As a result, the shutter 21 can be moved to the open position by a small pressing force against the cartridge 3. Further, the contact member 26 can be smoothly guided and moved onto the upper face of the cartridge 3 as a contact position. For example, the contact member guide portion 26a can be formed from a low frictional substance, such as polyacetal resin. In this case, the shutter 21 can be smoothly moved to the open position by exerting a reduced pressing force on the cartridge 3. Further, the contact member 26 can be smoothly guided and moved onto the upper face of the cartridge 3 by smaller pressing force.

In the above described shutter mechanism, the shutter 21 is opened and closed along the insertion port forming face 11b in the exterior of the body front portion 11. Accordingly, it is not necessary to provide additional space in the disk drive units for opening and closing the shutter 21. As a result, the apparatus body front portion 11 and the apparatus body case 12 are smaller in size and weight.

Figure 10:
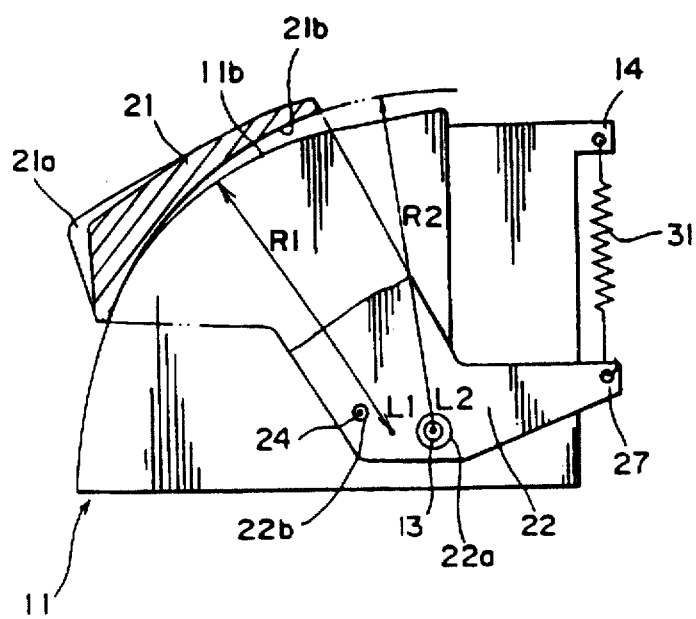
FIG. 10 is a side elevational view of the shutter of FIG. 5, illustrating the inter-relation of the shutter opening-closing mechanism and the apparatus body front portion.

FIG. 10 illustrates the shapes of the shutter and the apparatus body front portion in the shutter mechanism in the first embodiment of the present invention. As seen in FIG. 10, an inner face 21b of the shutter 21 opposite to the body front portion 11 is formed by a curved surface separated by a distance R1 from a virtual central line L1. The insertion port forming face 11b of the body front portion 11 is formed by a curved surface separated by a distance R2 from a swinging central line L2 (i.e., the pivot point) of the supporting stay 22. The inner face 21b of shutter 21 and the insertion port forming face 11b typically have different curvatures set such that R1 is smaller than R2 (R1<R2). The swinging shaft 13 is positioned such that a portion of the shutter inner face 21b near its lower end comes in contact with the insertion port forming face 11b when the shutter is in the closed position. As the shutter 21 is moved toward the open position, the shutter 21 is separated from the apparatus body front portion 11. Thus, a clearance corresponding to an opening degree of the shutter 21 is formed between the shutter inner face 21b and the insertion port forming face 11b.

As mentioned above, the shutter inner face 21b is separated by the distance R1 from the virtual central line L1 and the insertion port forming face 11b is separated by the distance R2 from the pivot point of supporting stay 22. A portion of this shutter inner face 21b near its lower end comes in contact with the insertion port forming face 11b when the shutter is in the closed position. Thus, when the shutter is in the closed position, contact between the shutter 21 and the insertion port forming face 11b inhibits (or prevents) airborne debris, such as dust and the like, from flowing into the interior of the shutter mechanism and the apparatus casing 12 through the insertion port 11a. As an opening degree of the shutter 21 is increased, a clearance between the shutter inner face 21b and the insertion port forming face 11b is increased. Accordingly, when the shutter 21 is moved toward the open position, it is possible to prevent the shutter inner face 21b from coming in contact with the insertion port forming face 11b so that the shutter 21 can be smoothly moved in the opening direction to the open position.

To maintain fluid motion of the shutter, and the supporting stays in relation to the body front portion over varying temperatures, coefficients of thermal expansion of the shutter 21, the supporting stay 22 and the apparatus body front portion 11 are preferably equal. When a temperature of each of these members is changed by a change in atmospheric temperature, a change in clearance between the shutter inner face 21b and the insertion port forming face 11b is prevented by the characteristics of the shutter 21, the supporting stay 22 and the apparatus body front portion 11.

As mentioned above, the shutter mechanism has a swingable supporting body for supporting a shutter, a sliding face portion formed on an shutter outer face, a contact member coming in contact with a cartridge within the apparatus body, and an operating rod for supporting this contact member and connected to the supporting body. The shutter is moved by these constructional elements along a circular locus between an open position and a closed position for respectively opening or closing an insertion port in association with a movement of the cartridge. Accordingly, for example, the shutter can be arranged outside the apparatus body so that the apparatus body can be made compact. Further, the contact member is smoothly guided and moved by a guide portion of the contact member to a contact position of the cartridge. Accordingly, it is possible to prevent the cartridge from being engaged with the contact member when the cartridge is inserted into a set position.

Further, the guide portion is formed in a convex shape extending in a sliding direction thereof so that a contact area of the guide portion for the cartridge is reduced. Thus, it is possible to reduce frictional force caused between the guide portion and the cartridge at a sliding time of the contact member. Therefore, pressing force applied to the cartridge can be reduced when the cartridge comes in contact with the contact member.

Further, the sliding portion is formed in a convex shape extending in a sliding direction thereof so that a contact area of the sliding portion for the cartridge is reduced. Accordingly, a damaging regional area of the sliding portion caused by a sliding movement of the cartridge can be reduced so that a reduction in appearance quality of the shutter can be minimized.

When at least the shutter is moved to the open position from the closed position, the shutter is opened in association with an inserting operation of the cartridge by the sliding portion inclined with respect to an inserting direction of the cartridge. Accordingly, the cartridge can be smoothly inserted into the apparatus body.

Further, an insertion port forming face of the apparatus body is formed by a curved surface separated by a first distance from a virtual central line. An inner face of the shutter is formed by a curved surface separated by a second distance from a swinging central line of the supporting body. The second distance is set to be longer than the first distance. A swinging center of the supporting body is positioned such that a portion of the shutter inner face near its lower end comes in contact with the insertion port forming face in the perfect closing position of the shutter. In accordance with such a structure, the shutter inner face is separated from the insertion port forming face in accordance with an opening degree of the shutter. Accordingly, when the shutter is opened, it is possible to prevent the shutter from engaging the insertion port forming face so that the shutter can be smoothly opened.

The shutter, the supporting body and a portion of the apparatus body near the insertion port forming face may be constructed such that coefficients of thermal expansion of the shutter, the supporting body and this apparatus body portion are approximately equal to each other. In this structure, clearances between these constructional members are maintained even when temperatures of these constructional members are changed.

Figure 11:
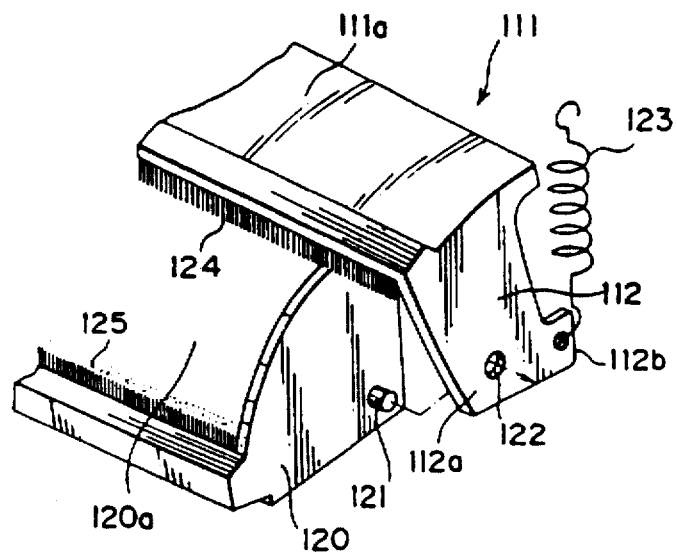
FIG. 11 is a perspective view of a portion of a shutter opening-closing mechanism according to a second embodiment of the present invention.

Referring to FIG. 11 a second embodiment of the shutter mechanism is shown. As seen in FIG. 11, the shutter mechanism of this embodiment includes a shutter body 111 pivotally secured to a chassis 120. A leg portion 112 extends from an arc face portion 111a of the shutter body 111 and has a substantially L-shape construction on a side of the shutter body 111. The leg portion 112 has a bent portion 112a having a receiving hole 122. A supporting pin 121 is inserted into the receiving hole 122. The supporting pin 121 is projected from a chassis 120 as a holding member disposed in a body case 103 of a disk drive unit, seen in FIG. 12. The shutter body 111 is rotatably (or pivotally) supported by the supporting pin 121 and the receiving hole 122.

Figure 12:
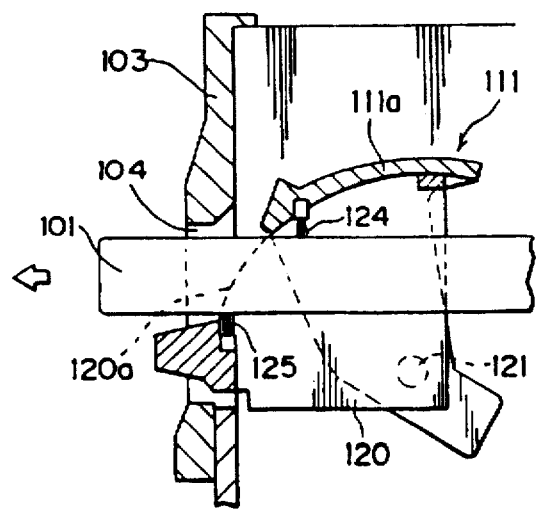
FIG. 12 is a side elevational view in partial cross-section of the shutter opening-closing mechanism of FIG. 11, illustrating the ejection of a cartridge from the apparatus.

A projecting portion 112b of leg portion 112 extends from the bent portion 112a. A coil spring 123 is engaged with the projecting portion 112b. The coil spring 123 is disposed to normally bias the shutter body 111 toward the closed position with respect to opening portion 120a of the chassis 120. The opening portion 120a of the chassis 120 corresponds to an opening portion 104 of the body case 103. As seen in FIG. 12, a brush 124 is disposed on a rear face of the arc face portion 111a of the shutter body 111, and a brush 125 is disposed on an inner side of the opening portion 120a of the chassis 120. Brushes 124 and 125 are respectively attached to the arc face portion 111a and the opening portion 120a by a suitable attaching method such as press fit, adhesion, screwing, embedding, and the like. Each brush 124 and 125 constitutes an external interrupting member. The brushes 124 and 125 may be disposed in either the shutter body 111 or the chassis 120 or in both.

FIG. 12 illustrates an ejecting state of the cartridge 101. In this ejecting state, the shutter body 111 is moved upward to the open position and the opening portion 120a is opened. However, the interior of the body case 103 is interrupted from the exterior thereof by the brushes 124 and 125 so that it is possible to inhibit and/or prevent airborne debris, such as dust, from flowing into the body case 103.

Figure 13:
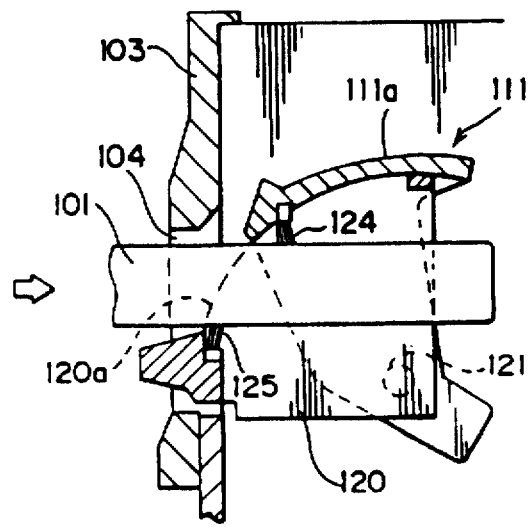
FIG. 13 is a side elevational view in partial cross-section similar to FIG. 12, illustrating insertion of a cartridge into the apparatus.

FIG. 13 illustrates an inserting state of the disk cartridge 101. In this inserting state, the shutter body 111 is also moved upward to the open position and the opening portion 120a is opened. However, dust and other debris on faces of the cartridge 101 can be removed therefrom by the brushes 124 and 125.

Figure 14:
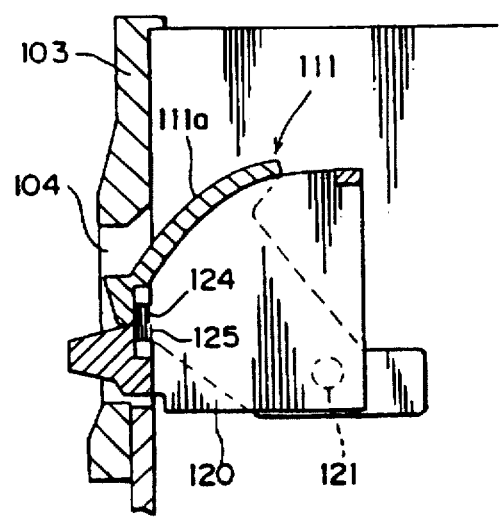
FIG. 14 is a side elevational view in partial cross-section similar to FIG. 12, illustrating the shutter in a closed position.

FIG. 14 illustrates shutter body 111 in the closed position. In this closed position, end portions of the brushes 124 and 125 respectively disposed in the shutter body 111 and the chassis 120 are inserted into each other so that dust proof effects in the closing state of the shutter body can be further improved.

In an alternative configuration, a resilient thin plate, such as a thin film member, may be used instead of the brushes 124 and 125. The thin film member may be constructed from a rubber material, an artificial leather, an unweaving cloth, or equivalent materials capable of inhibiting dust from entering the body case and capable of removing dust and the like from the cartridge surfaces.

Figure 15:
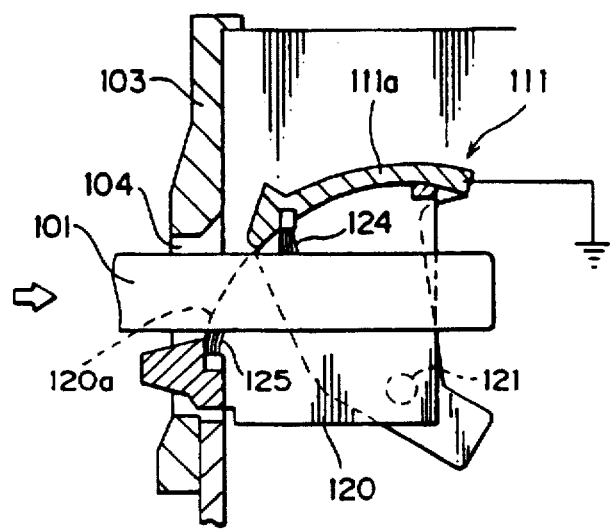
FIG. 15 is a side elevational view in partial cross-section of a third embodiment of the shutter opening-closing mechanism, and illustrating insertion of a cartridge into the apparatus.

Referring to FIG. 15, a third embodiment of the shutter mechanism is shown. In this third embodiment, at least one of the brushes 124 and 125 described above in the second embodiment is constructed from an electrically conductive material and is electrically connected to ground via the chassis 120. Therefore, static electricity existing on the surfaces of the cartridge 101 may be removed therefrom. Accordingly, dust and the like can be easily removed from the cartridge 101 and it is possible to set a cartridge state in which dust and the like are not easily reattached to the cartridge.

Alternatively, at least one of the brushes 124 and 125 may be constructed from an electrically conductive member, such as a conductive material composed of a resilient member, a thin film member.

Figure 16:
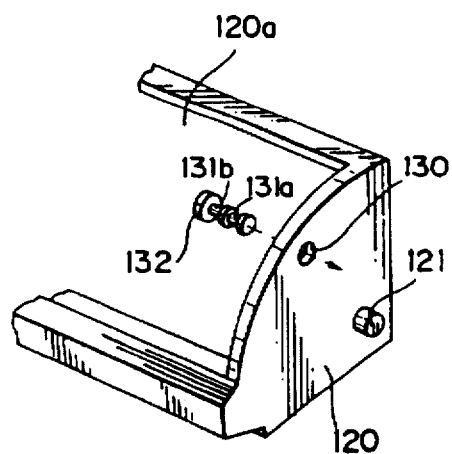
FIG. 16 is a perspective view of a fourth embodiment of the shutter opening-closing mechanism, illustrating a pin member.
Figure 17A:
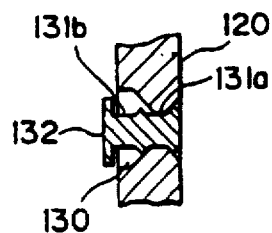
FIGS. 17a and 17b are cross-sectional views of the pin member of FIG. 16 in the shutter opening-closing mechanism according to the fourth embodiment of the present invention.
Figure 17B:
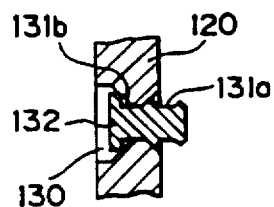
Figure 18:
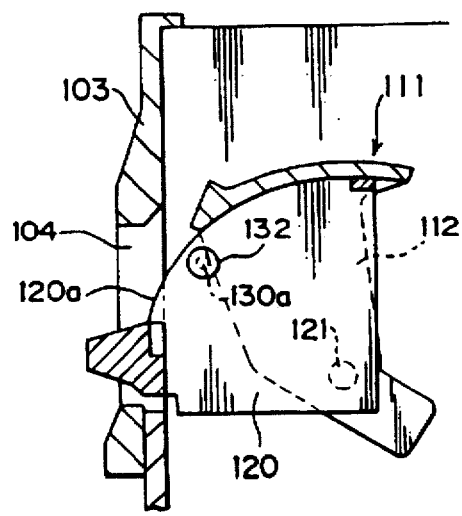
FIG. 18 is a side elevational view in partial cross-section of the shutter opening-closing mechanism according to the fourth embodiment and illustrating a holding state of a shutter body.

Referring now to FIGS. 16–18, a fourth embodiment for the shutter mechanism of the present invention is shown. In this embodiment, an engaging hole 130 is formed in a side wall of a chassis 120, as seen in FIG. 16. A pin member 132 is inserted and attached into this engaging hole 130. The pin member 132 is constructed by a moving member having small diameter portions 131a and 131b in two portions thereof.

As shown in FIG. 17a, the pin member 132 is normally in a state in which no end portion of the pin member 132 is projected from the side wall of the chassis 120. In this state, a right-hand small diameter portion 131a is engaged with the engaging hole 130.

Disk drive units having this fourth embodiment for a shutter mechanism may be used in clean environments. If the cartridge 101 is inserted and removed from the unit many times over a period of time, the user may press the pin member 132 and the end portion of the pin member 132 is projected from the side wall of the chassis 120, as shown in FIG. 17b. Thus, the left-hand small diameter portion 131b is engaged with the engaging hole 130. The shutter body 111 is once opened greatly to set the above projecting state of the pin member 132. Thus, as shown in FIG. 18, the pin member 132 is engaged with a leg portion 112 as an engaging portion of the shutter body 111 so that the shutter body 111 remains in the open position. Since the opening portion 120a is in an opening state, it is possible to improve operability of the cartridge 101 when the cartridge 101 is replaced with another. The pin member 132 can be returned to the normal state of FIG. 17a by pressing the pin member 132 on a left-hand inner side from the projecting state of FIG. 17b. The pin member 132 may be disposed in the shutter body 111 such that the pin member 132 is engaged with a portion of the chassis 120.

Figure 19:
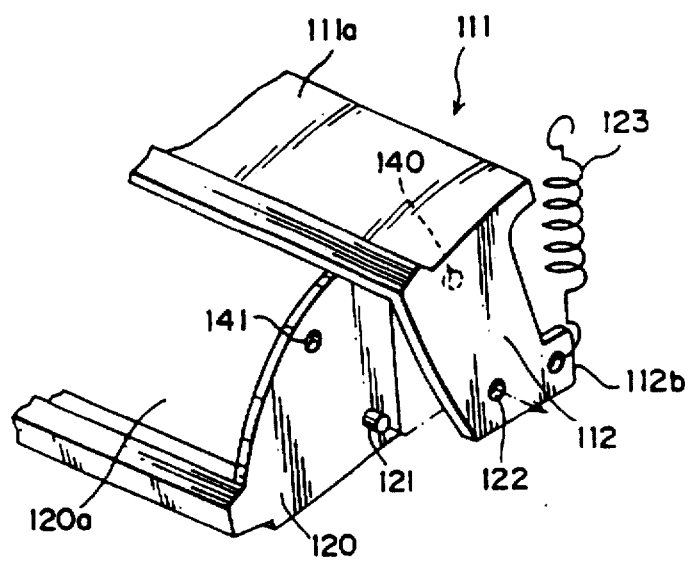
FIG. 19 is a perspective view of a fifth embodiment of the shutter opening-closing mechanism according to the present invention.
Figure 20:
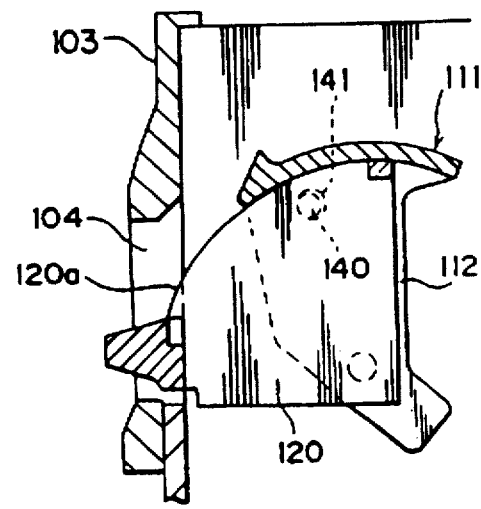
FIG. 20 is a side elevational view in partial cross-section of the shutter opening-closing mechanism of FIG. 19, illustrating the shutter in a holding state.

FIGS. 19 and 20 illustrate a fifth embodiment of the shutter mechanism according to the present invention. In FIG. 19, a projecting portion 140 is disposed on the inner side of leg portion 112 of a shutter body 111. This projecting portion 140 is engaged with a recessed portion 141 disposed in a chassis 120.

The projecting portion 140 is engaged with the recessed portion 141 when the shutter body 111 is opened at an angle of rotation larger than a normal rotational angle. Thus, similar to the fourth embodiment, the shutter body 111 can be held in the open position.

When the shutter body 111 is rotated in a closing direction toward the closed position, the projecting portion 140 is disengaged from the recessed portion 141. In accordance with such a structure, the shutter body 111 can be maintained in the open position when necessary. The projecting portion 140 may be disposed in the chassis 120. In this case, the recessed portion 141 engaged with the projecting portion 140 is disposed in the shutter body 111.

The shutter mechanism of embodiments one through five is also described in application Ser. No. 08/118,802 filed Sep. 8, 1993 which is incorporated in its entirety herein by reference. Additional embodiments of the shutter mechanism and a more detailed discussion of the disk drive units is provided in application Ser. No. 08/236,624 filed Apr. 29, 1994 which is incorporated in its entirety herein by reference.

Figure 21:
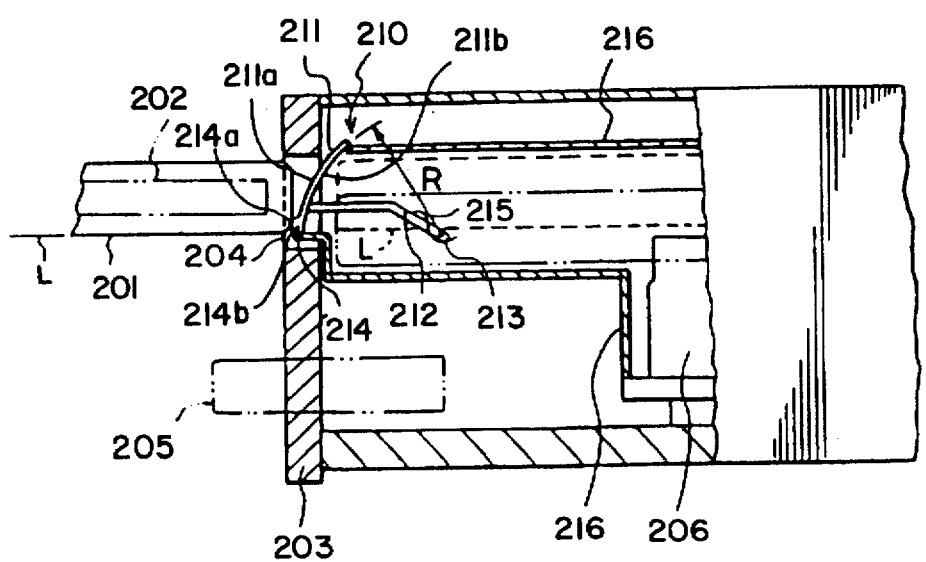
FIG. 21 is a side elevational view in partial cross-section illustrating the construction of the disk drive unit in accordance with a sixth embodiment of the present invention.

FIGS. 21–52 illustrate various additional embodiments of the shutter mechanism of the present invention. Referring to FIG. 21 a disk cartridge 201 has an disk 202 therein. An opening portion 204 is formed on one side of a body case 203 to insert the disk cartridge 201 into the body case 203 and remove the disk cartridge 201 out of the body case 203. A well-known ejecting button 205 is slidably attached to the body case 203 under the opening portion 204. A motor 206 is arranged within the body case 203 and is constructed for receiving the disk 202 thereon and rotating the disk 202.

Figure 22:
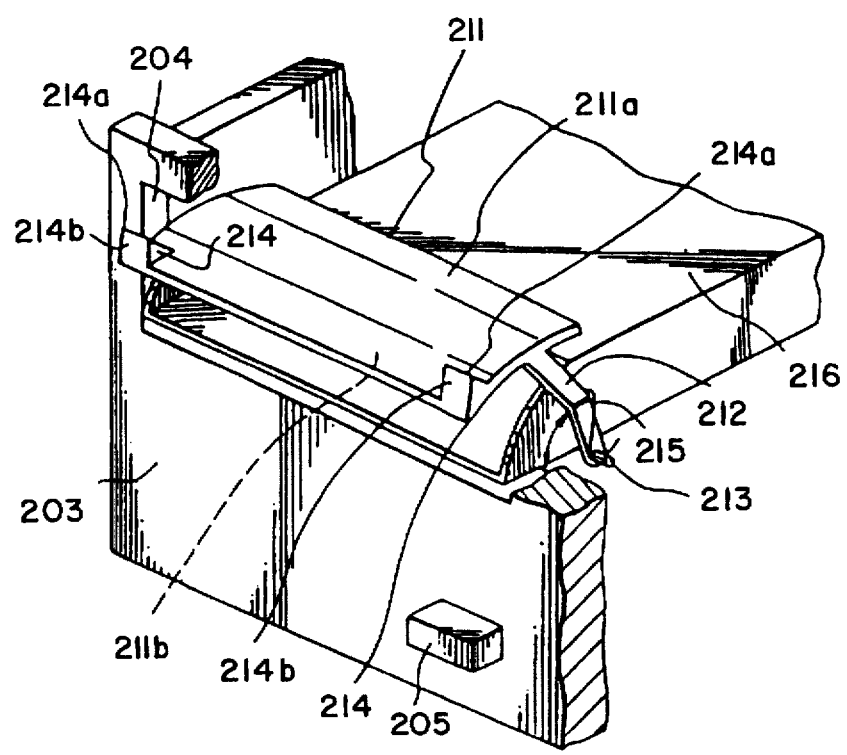
FIG. 22 is a perspective view in partial cross-section the disk drive unit of FIG. 21 illustrating the shutter mechanism according to the sixth embodiment.

Referring to FIGS. 21 and 22 a shutter mechanism according to a sixth embodiment of the present invention is shown. The disk drive unit in this embodiment includes a shutter 210 composed of a shutter body 211 and a leg portion 212. The shutter body 211 is formed in the shape of an arc seen from a side of the shutter 210. The leg portion 212 extends inside a body case 203 from the shutter body 211. A center 213 of rotation of the shutter 210 is located below an extension line L on a lower face of disk cartridge 201 when the disk cartridge is inserted into the body case 203. Namely, the center 213 of rotation of the shutter 210 is located on the side of a motor 206 below the extension line L. An end portion of the leg portion 212 is rotatably supported by the body case 203 at the center 213 of rotation of the shutter 210. Outer and inner arc faces 211a and 211b of the shutter body 211 are formed in a shape approximately equal to the shape of an arc of a radius R around the above center 213 of rotation. A projecting portion 214 is formed on the outer arc face 211a so that the disk cartridge 201 comes in contact with an end portion 214a of the projecting portion 214 and then comes in contact with a lower portion 214b of the projecting portion 214. A biasing spring 215 is attached to the leg portion 212 to bias the shutter body 211 in a direction in which an opening portion 204 is closed. A dustproof case 216 is disposed within the body case 203.

Figure 23A:
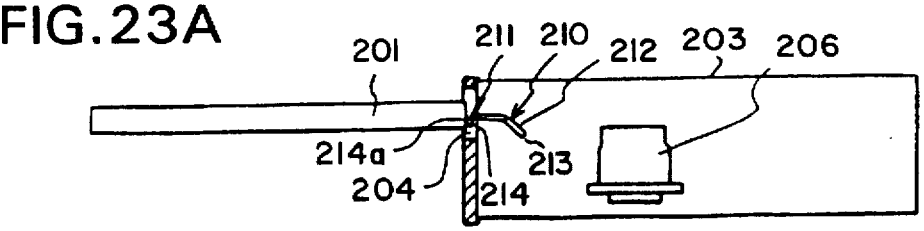
FIGS. 23a to 23f are side elevational views of the disk drive unit of FIG. 21 explaining the operation of the disk drive unit according to the sixth embodiment of the present invention.
Figure 23B:
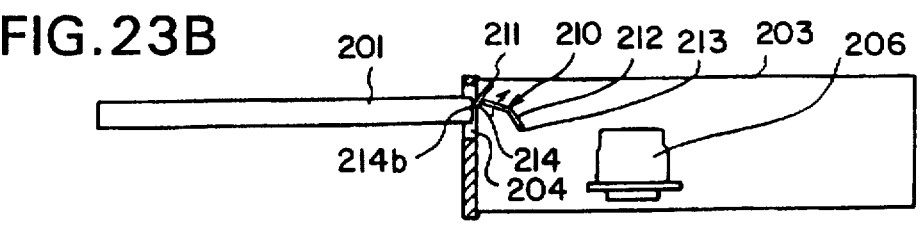
Figure 23C:
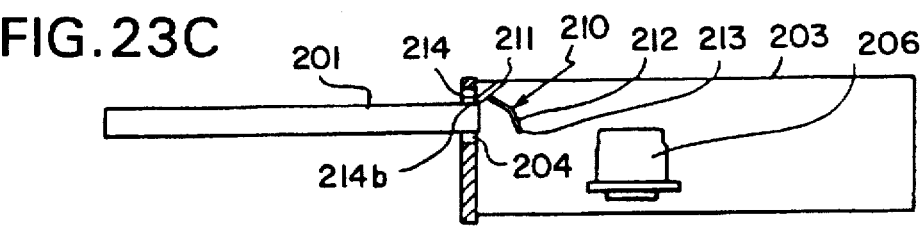
Figure 23D:
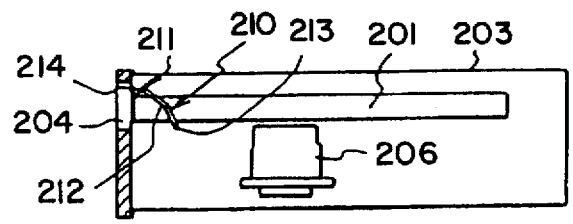
Figure 23E:
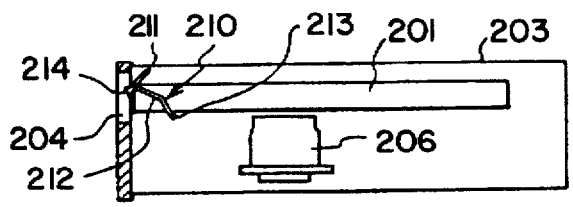

The operation of the disk drive unit in this embodiment will next be described with reference to FIGS. 23a to 23f. As shown in FIG. 23a, when the disk cartridge 201 is inserted into the body case 203 from the opening portion 204, a front end portion of the disk cartridge 201 first comes in contact with the end portion 214a of the projecting portion 214 of the shutter body 211. When the disk cartridge 201 is further inserted into the body case 203, the shutter 210 is rotated around the center 213 of rotation in the clockwise direction to the open position. Thus, as shown in FIG. 23b, the lower portion 214b of the projecting portion 214 is raised along a front end face of the disk cartridge 201. When the lower portion 214b of the projecting portion 214 reaches an upper side face of the disk cartridge 201, as shown in FIG. 23c, the disk cartridge is inserted into the interior of the body case 203. When the projecting portion 214 reaches a rear end portion of the disk cartridge 201, as seen in FIG. 23d, the biasing force of the biasing spring 215, seen in FIG. 21, is applied to the shutter 210. Accordingly, the shutter 210 is rotated around the center 213 of rotation in the counterclockwise direction to the closed position, as seen in FIG. 23e. Thus, the opening portion 204 of body case 203 is closed, as seen in FIG. 23f.

Figure 23F:
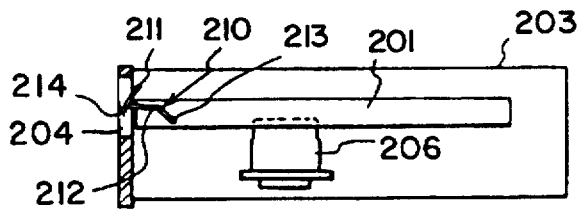

In the closing state of the opening portion 204, seen in FIG. 23f, the shutter 210 is reliably closed even when a complete mounting position of the disk cartridge 201 for completely mounting the disk cartridge 201 onto the motor 206 is set in the vicinity of the opening portion 204, as shown by a two-dotted chain line in FIG. 21. The dustproof case 216 partially extending until the opening portion 204 comes in contact with a lower end of the shutter body 211 so that a space formed by the dustproof case 216 is closed. Therefore, it is possible to prevent airborne debris, such as dust and the like, from entering the dustproof case 216 from the exterior thereof.

Further, the shutter body 211 is formed in the shape of an arc, and air for cooling a driving portion can flow easily into the body case 203 on and along the outer arc face 211a, so that it is unnecessary to dispose a hole for cooling on the body case 203 above the opening portion 204.

Figure 24:
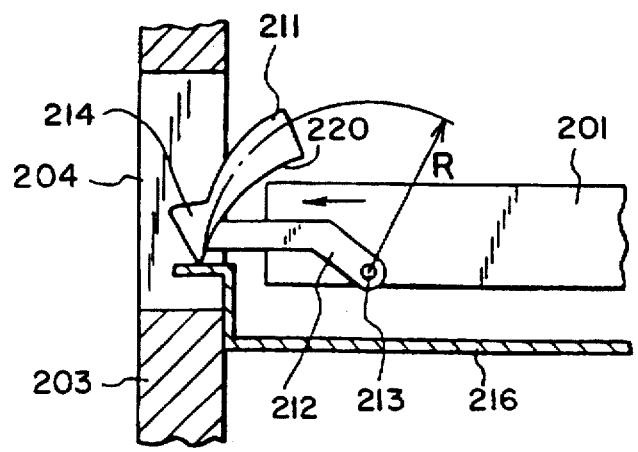
FIG. 24 is side elevational view in partial cross-section of the shutter mechanism of FIG. 22.

When the disk cartridge 201 is ejected from the body case 203, an operator pushes an ejecting button 205, seen in FIG. 21, and the shutter 210 is opened by operating the shutter mechanism in association with the operation of the loading mechanism. Thereafter, the disk cartridge 201 is ejected from the opening portion 204. As seen in FIG. 24, an inner face of the shutter body 211 can be inclined inward with respect to the radius R of an arc around the center 213 of rotation so as to form a slanting face 220. In this case, the rear end portion of the disk cartridge 201 comes in contact with the slanting face 220 by applying ejecting force to the disk cartridge 201 and transversely moving the disk cartridge. Thus, the shutter 210 can be pushed and automatically opened by rotational force provided by a component of the ejecting force.

Figure 25:
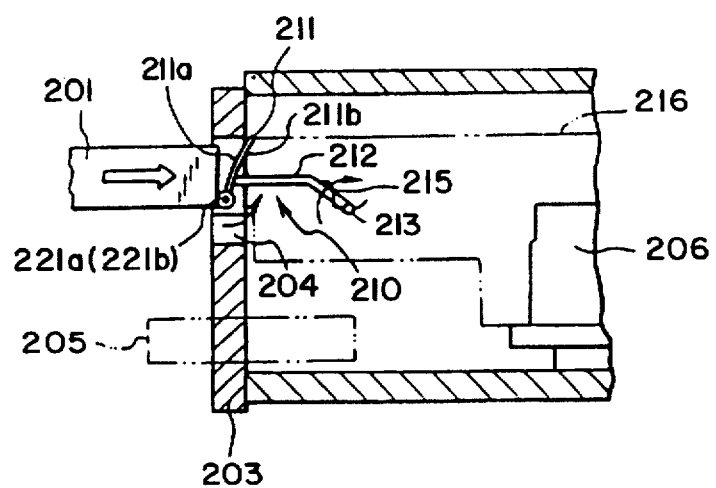
FIG. 25 is side elevational view in partial cross-section illustrating the construction of the disk drive unit in accordance with a seventh embodiment of the present invention.
Figure 26:
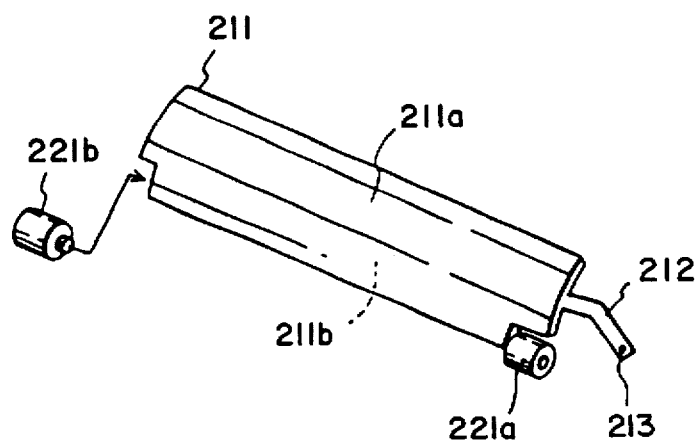
FIG. 26 is a perspective view of the shutter mechanism of FIG. 25.

Referring to FIGS. 25 and 26, a seventh embodiment of the shutter mechanism is shown. In this embodiment, a pair of rollers 221a and 221b are rotatably disposed in a lower portion of the shutter body 211. Rollers 221a and 221b come in contact with the disk cartridge 201. The rollers 221a and 221b reduce frictional resistance caused when a contact portion of the disk cartridge 201 engages the shutter 210 when the disk cartridge 201 inserted into the body case 203.

In the above embodiment, the biasing spring 215 is arranged to normally bias the shutter 210 in a direction in which the opening portion 204 is closed, i.e., spring 215 normally biases shutter 210 to the closed position. However, the biasing spring 215 may bias the shutter 210 in a direction in which the opening portion 204 is opened if force for closing the opening portion 204 by the shutter 210 is provided by the loading mechanism. Further, it is possible to use a biasing spring or a toggle spring for biasing the shutter 210 in opening and closing directions thereof in a state in which an arbitrary position of the shutter 210 in opening and closing regions thereof is set to a neutral position.

Figure 27:
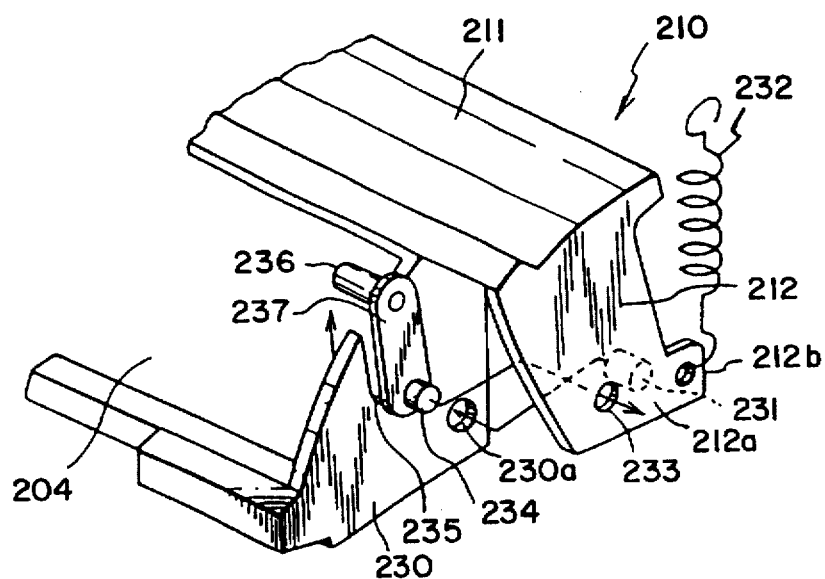
FIG. 27 is a perspective view of a portion of the disk drive unit in accordance with an eighth embodiment of the present invention.
Figure 28:
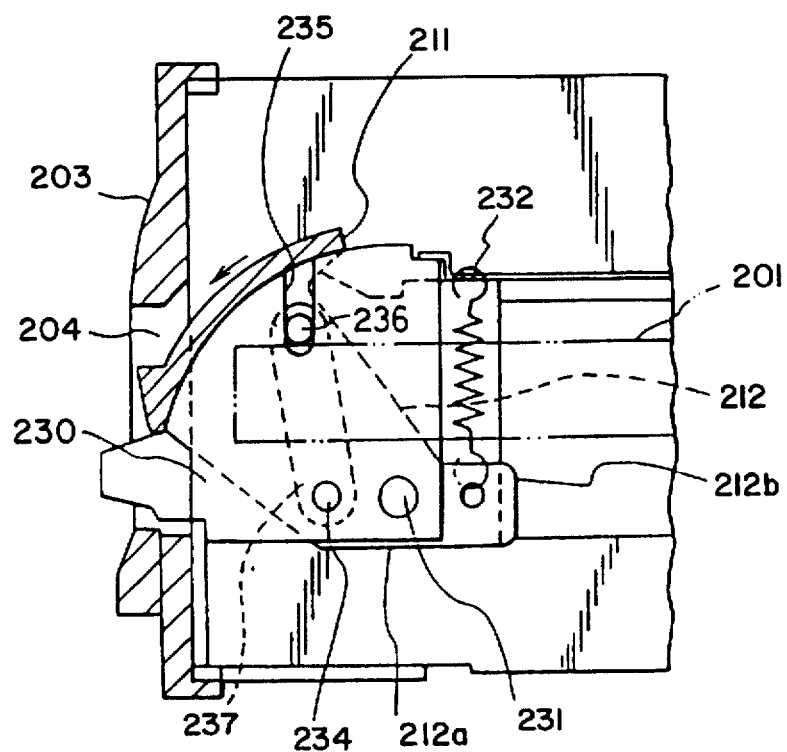
FIG. 28 is a side elevational view in partial cross-section of the disk drive unit in accordance with the eighth embodiment of the present invention.

Referring to FIGS. 27–29 an eighth embodiment of the shutter mechanism of the present invention is shown. In this embodiment, when the disk cartridge 201 is ejected from the body case 203, the disk cartridge does not come in contact with shutter 210 so as to improve the durability of the disk drive unit.

In FIGS. 27 and 28, leg portion 212 extends from shutter body 211 which has an arc shape seen from a side of the disk drive unit. The leg portion 212 is approximately formed in the shape of an L as seen from the side of the disk drive unit. A support shaft 231 is fixed to a bent portion 212a of the leg portion 212 and is rotatably inserted into a receiving hole 230a of a chassis portion 230 disposed in the body case 203. The support shaft 231 is preferably set at the center 213 of rotation. A projecting portion 212b extends from the bent portion 212a. A coil spring 232 is attached to the projecting portion 212b to bias the shutter body 211 in a direction in which the opening portion 204 is closed, i.e., spring 232 biases the shutter to the closed position.

A first pin portion 234 and a cam 237 formed in the shape of an elongated plate are arranged between the leg portion 212 and the chassis portion 230. The first pin portion 234 is inserted into a hole 233 formed in the leg portion 212 in a transverse direction of the support shaft 231. A second pin portion 236 is fixed to the cam 237 and is inserted into a receiving groove 235 disposed in an upper portion of the chassis portion 230. Preferably, the second pin portion 236 is longer than the first pin portion 234.

Figure 29A:
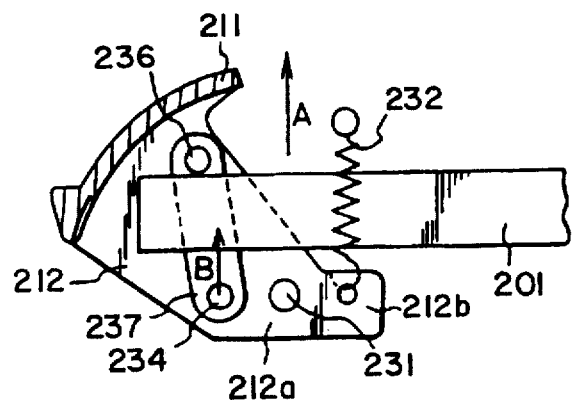
FIGS. 29a to 29c are explanatory views showing an operation of the disk drive unit in the eighth embodiment of the present invention.

The operation of the shutter mechanism for this embodiment of the disk drive unit will next be described with reference to FIGS. 29a to 29c. In FIG. 29a, when the ejecting button 5, seen in FIG. 21, is pushed, the disk cartridge 201 is raised in the direction of an arrow "A" by the loading mechanism. In response, an upper portion of the disk cartridge 201 comes in contact with the second pin portion 236 of the cam 237. Force for moving the disk cartridge 201 upward is applied to the second pin portion 236 so that the second pin portion 236 is moved upward within the receiving groove 235, seen in FIG. 28, thereby raising the cam 237 and the first pin portion 234 in the direction of an arrow "B", seen in FIG. 29a.

Figure 29B:
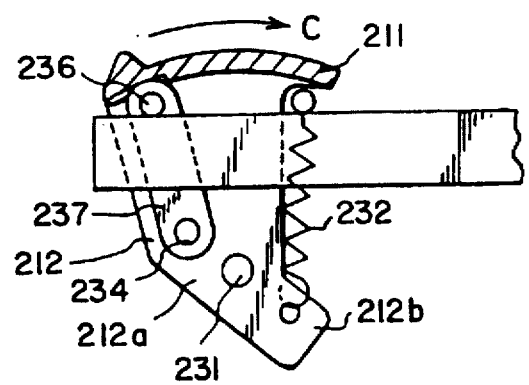
Figure 29C:
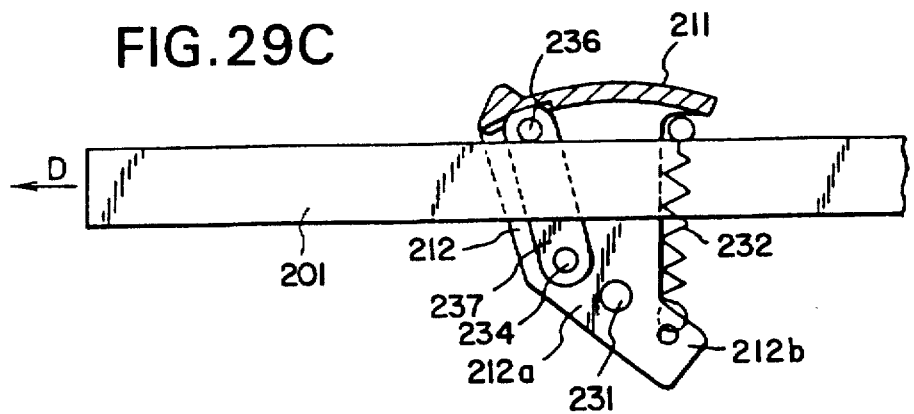

As seen in FIG. 29b, since the cam 237 is raised, the shutter body 211 is rotated around the support shaft 231 in the clockwise direction (in the direction of an arrow "C"), thereby opening the opening portion 204. In this state, as shown in FIG. 29c, the disk cartridge 201 is externally ejected from the body case 203 in the direction of an arrow "D".

As noted, the disk cartridge 201 does not contact the shutter body 211 during the above described ejecting operation. When the disk cartridge 201 is removed from the body case 203, no force for raising the second pin 236 is applied to this second pin 236. Accordingly, the biasing force of the coil spring 232 is applied to the shutter body 211 so that the shutter body is rotated in the counterclockwise direction, thereby moving the shutter to the closed position, to close the opening portion 204. When the shutter body 211 is closed, the disk cartridge 201 is inserted into the body case 203 as in the above described sixth embodiment of the present invention. Therefore, the inserting operation of the disk cartridge 201 is not described in the following description.

Figure 30:
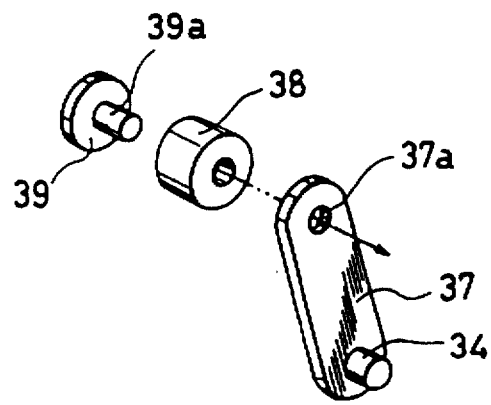
FIG. 30 is a perspective view of a portion of the shutter mechanism according to the eighth embodiment of the present invention.

FIG. 30 illustrates an alternative example of the cam 237 discussed above. In this alternative configuration, an attaching hole 237a is formed in an upper portion of the cam 237. A roller 238 is attached to cam 237 through a stopper 239 having a shaft body 239a fixed to the attaching hole 237a. When ejecting the disk cartridge 201, the roller 238 is moved in an upper portion of the disk cartridge 201 by making the roller 238 come in contact with the disk cartridge while the roller 238 is rotated. Accordingly, a discharging (or ejecting) load is reduced and the disk cartridge 201 is smoothly moved so that operability and durability of the disk drive unit is improved.

Figure 31:
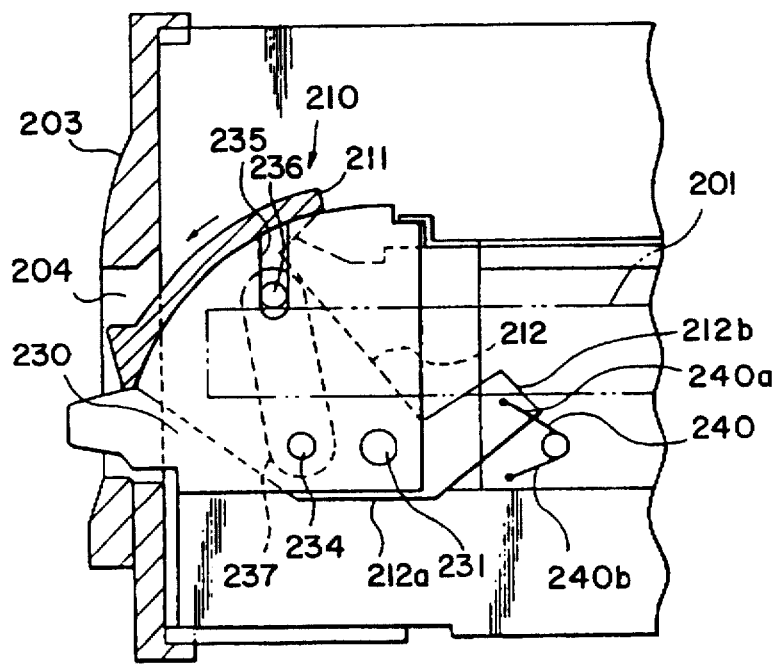
FIG. 31 is a side elevational view in partial cross-section of the disk drive unit in accordance with a ninth embodiment of the present invention.
Figure 32A:
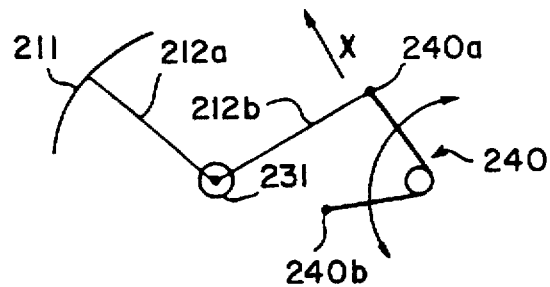
FIGS. 32a to 32c are views for explaining an operation of the shutter mechanism of FIG. 31.
Figure 32B:
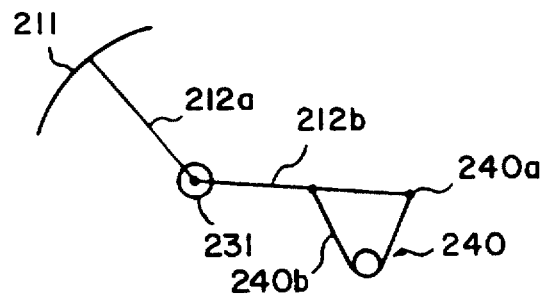
Figure 32C:
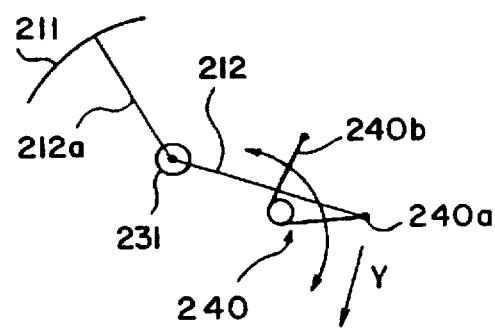
Figure 33:
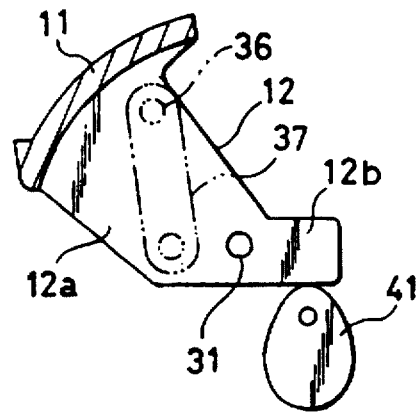
FIG. 33 is an explanatory view showing an alternative example of a shutter operation.

Referring to FIGS. 31-33 a ninth embodiment of the shutter mechanism is shown. In FIG. 31, constructional members corresponding to those explained in the embodiment of FIGS. 27 and 28 are designated by the same reference numerals and a detailed explanation of these members is omitted in the following description.

A biasing spring 240 has a bent shape and one end 240a of the biasing spring 240 is fixed to a projecting portion 212b of leg portion 212 in shutter body 211. The other end 240b of the biasing spring 240 is fixed to a suitable member disposed within a chassis portion 230.

The operation of the shutter mechanism of this embodiment is shown in FIGS. 32a to 32c. The shutter body 211 is biased and rotated in an opening direction irrespective of the operation of a second pin 236 while the shutter body 211 is opened by the above cam 237. Thus, at a discharging time (ejecting) of the disk cartridge 201, the second pin 236 of the cam 237 does not come in contact with the disk cartridge 201, thereby reducing the discharging load. More particularly, the biasing spring 240 exerts a biasing force in a direction in which both ends of the biasing spring 240 are opened at any time. The biasing spring 240 exerts the biasing force to the projecting portion 212b in a closing direction "X", seen in FIG. 32a, thereby moving the shutter body 211 to the closed position. At the discharging time of the disk cartridge 201, the shutter body 211 is opened until an intermediate position thereof, seen in FIG. 32b, by the above opening operation of the shutter body 211 using the cam 237. Further, the biasing spring 240 passes through a position in which the center of a support shaft 231 of the shutter body 211 and both ends 240a and 240b of the biasing spring 240 are aligned and located on one straight line. Thereafter, as shown in FIG. 32c, the biasing spring 240 biases the projecting portion 212b in a Y-direction as an opening direction.

The shutter body 211 is moved in the opening direction by receiving this biasing force. In a state in which the shutter body 211 is completely opened, the optical disk cartridge 201 is separated from the second pin 236 of the cam 237.

Referring to FIG. 33, an eccentric rotating cam 241 may come in contact with the projecting portion 212b of the shutter body 211. In this case, similar to the above action of the biasing spring 240, the shutter body 211 is rotated in an opening direction thereof while the shutter body 211 is opened by the cam 237. When the disk cartridge 201 is moved at a discharging time thereof, the disk cartridge 201 does not come in contact with the second pin 236.

In the above embodiment, a front end portion of the disk cartridge 201 is inserted into opening portion 204 of body case 203 while a rear end portion of the disk cartridge 201 is pushed by manual operation. When the rear end portion of the disk cartridge 201 is inserted into the opening portion 204, there is a case in which a portion of operator's fingers contacts the chassis portion 230 around the opening portion 204. In this case, it is not easy to insert the rear end portion of the disk cartridge 1 into the opening portion 4.

Figure 34:
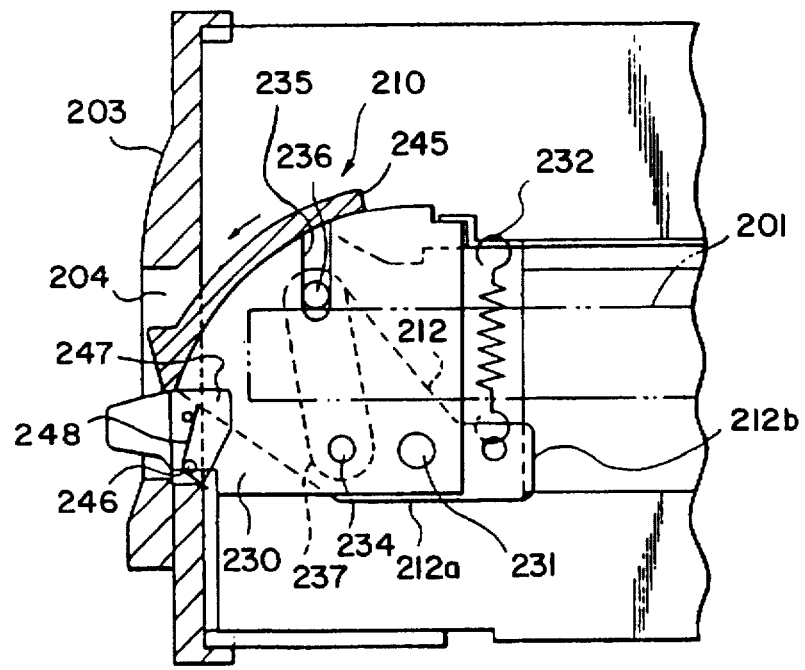
FIG. 34 is a side elevational view in partial cross-section of the disk drive unit in accordance with a tenth embodiment of the present invention.

FIG. 34 illustrates a tenth embodiment of the shutter mechanism for the disk drive unit. In this embodiment, it is possible to solve the above noted problem about the insertion of the rear end portion of the disk cartridge 201. In FIG. 34, shutter 210 is constructed by a first door 245 having a support shaft 231 as a center of rotation and a second door 247 having a radius of rotation smaller than that of the first door 245. The operation of the first door 245 is similar to that of the shutter body 211 described above with respect to the eighth embodiment. An upper side portion of the second door 247 comes in contact with the first door 245. The second door 247 is arranged such that a support shaft 246 of the second door 247 as a center of rotation is located near an opening portion 204 of a case body 203 in comparison with the above support shaft 231. A biasing spring 248 biases the second door 247 in the counterclockwise direction.

Figure 35A:
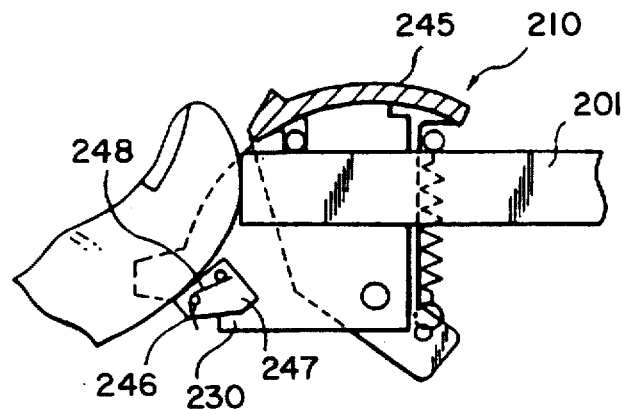
FIGS. 35a and 35b are views for explaining an operation of the shutter mechanism for the disk drive unit of FIG. 34.
Figure 35B:
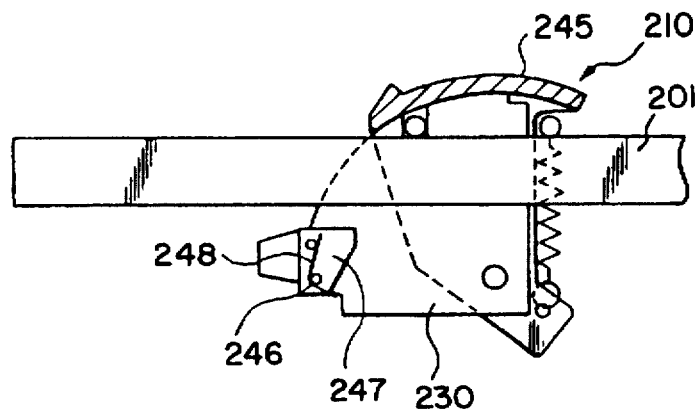

FIGS. 35a and 35b are views for illustrating the operation of the disk drive unit in this embodiment. FIG. 35a illustrates an operating state of the disk drive unit at the time of inserting a disk cartridge 201. The second door 247 is rotated in the clockwise direction against biasing force of the biasing spring 248 when a rear end portion of the disk cartridge 201 is pushed into the chassis portion 230. Thus, the second door 247 does not prevent manual application of pressure to the cartridge 201.

FIG. 35b illustrates an operating state of the disk drive unit at a discharging state of the disk cartridge 201. The second door 247 is held in a fixed state by the biasing spring 248 so that no discharging operation of the disk cartridge 201 is prevented by the second door 247.

Figure 36:
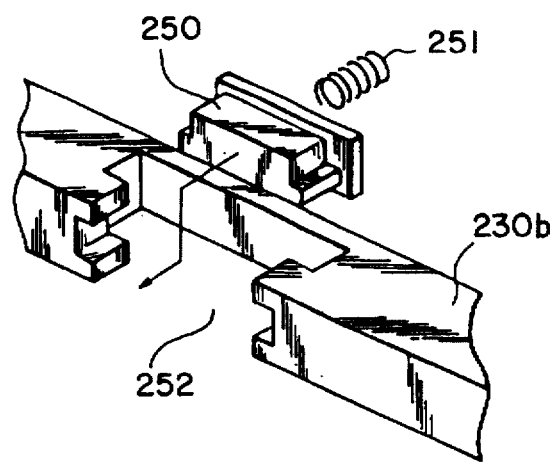
FIG. 36 is a perspective view of a portion of the shutter mechanism of the disk drive unit in accordance with an eleventh embodiment of the present invention.
Figure 37:
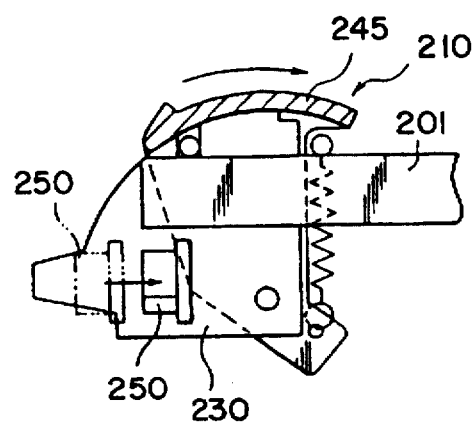
FIG. 37 is a view for explaining an operation of the disk drive unit according to the eleventh embodiment of the present invention.

Referring to FIGS. 36 and 37 an eleventh embodiment of the shutter mechanism for the disk drive unit is shown. In this embodiment, a door body 250 is utilized as a second door and is different from that shown in the tenth embodiment. Namely, the door body 250 is disposed in a notch 252 formed in a front frame portion 230b of chassis portion 230 such that the door body 250 is not rotated but is linearly moved by receiving the resilient force of a coil spring 251. As seen in FIG. 37, the door body 250 is manually pushed inside the chassis portion 230 against the resilient force of the coil spring 251 at the inserting time of the disk cartridge 201. In this configuration, manual application of pressure against the disk cartridge 201 is not prevented by the door body 250.

Figure 38:
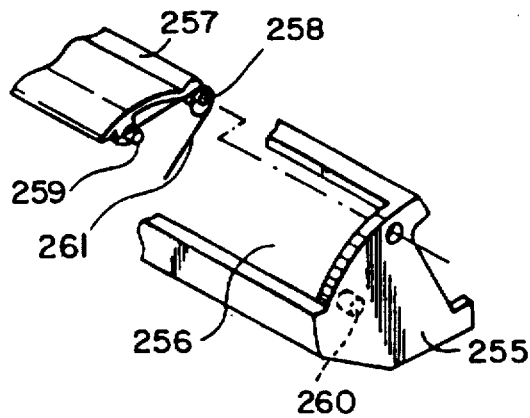
FIG. 38 is a perspective view of a portion of the shutter mechanism of the disk drive unit in accordance with a twelfth embodiment of the present invention.
Figure 39:
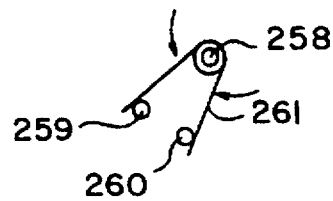
FIG. 39 is a view for explaining a torsional spring shown in FIG. 38.

Referring to FIGS. 38–40 a twelfth embodiment of the shutter mechanism according to the present invention is shown. In this embodiment, the operation of a first door 255 is similar to the operation of the shutter body 211 described in the eighth embodiment. A rectangular opening 256 is formed in the first door 255. An upper pin 258 of a second door 257 is rotatably supported by the first door 255 having opening 256. As shown in FIG. 39, one end of a torsional spring 261 resiliently comes in contact with a lower pin 259 of the second door 257. The other end of the torsional spring 261 resiliently comes in contact with an engaging pin 260 disposed on an inner wall of the first door 255. A winding portion of the torsional spring 261 is inserted onto the above upper pin 258. The torsional spring 261 has a biasing force in a direction in which the upper pin 259 approaches the engaging pin 260. The torsional spring 261 maintains a state in which the opening 256 is closed by the second door 257.

Figure 40A:
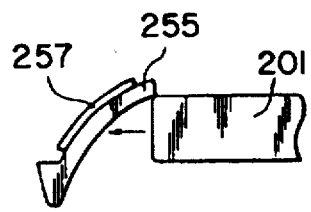
FIGS. 40a and 40b are views for explaining the operation of the shutter mechanism of FIG. 38.
Figure 40B:
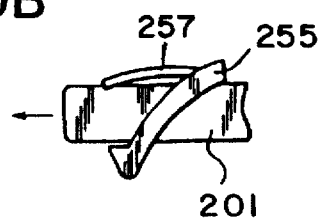

When inserting a disk cartridge 201, the first door 255 and the second door 257 are integrally rotated together in an opening direction. When ejecting the disk cartridge 201, only the second door 257 is rotated and opened outward since the second door 257 is pushed by an end portion of the disk cartridge 201, as seen in FIGS. 40a and 40b. After the disk cartridge 201 is removed from the disk drive unit, the second door 257 again closes the opening 256 of the first door 255. As mentioned above, it is sufficient to rotate only the compact second door 257 when ejecting the disk cartridge 201, thereby reducing a discharging load.

The disk drive unit is used in various arrangements. For example, the disk drive unit is arranged transversely, longitudinally or slantingly. Therefore, the discharging distance of the disk cartridge 201 from the body case 203 is not necessarily constant. For example, it may occur that the disk cartridge 201 is excessively pushed and moved outward so that the disk cartridge 201 is damaged.

Figure 41:
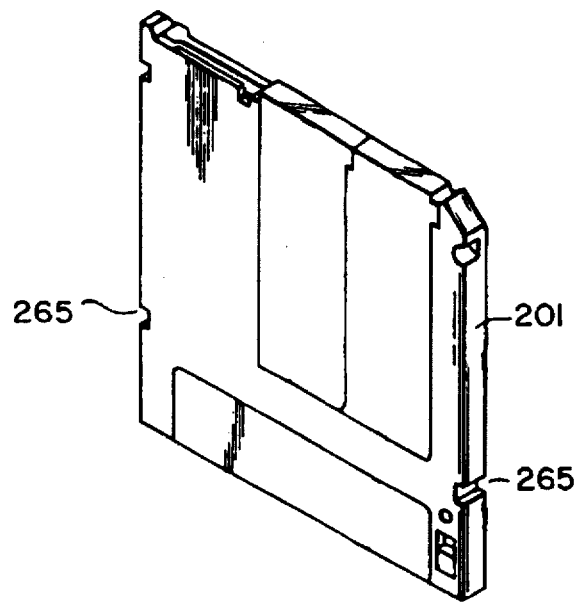
FIG. 41 is a perspective view of disk cartridge.

In an thirteenth embodiment of the shutter mechanism of the present invention, a notch portion 265 for an automatic change is disposed in a general disk cartridge 201, as seen in FIG. 41. The second pin 236 of the cam 237 for moving the shutter body 211 in the eighth embodiment shown in FIGS. 27 and 28, is used as an engaging portion and is detachably engaged with the above notch portion 265.

Figure 42:
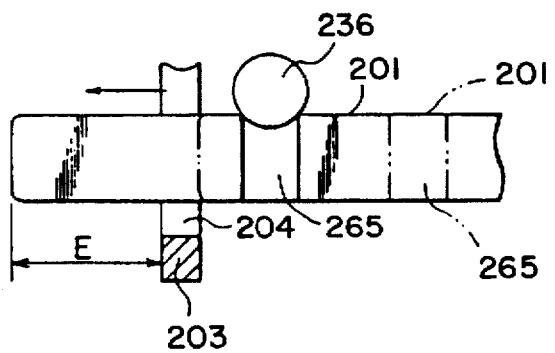
FIG. 42 is an explanatory view of a portion of the disk drive unit in accordance with a thirteenth embodiment of the present invention.

Accordingly, as seen in FIG. 42, a dropping amount of the disk cartridge 201 is set such that the second pin 236 is stopped in a recessed position of the notch portion 265 at a discharging time (i.e., during ejection) of the disk cartridge 201. Thus, it is possible to constantly set a discharging distance "E" of the disk cartridge 201 from an opening portion 204. When the disk cartridge 201 is removed from the disk drive unit in this state, the second pin 236 gets over the notch portion 265 and the disk cartridge 201 can be removed from the disk drive unit.

Figure 43:
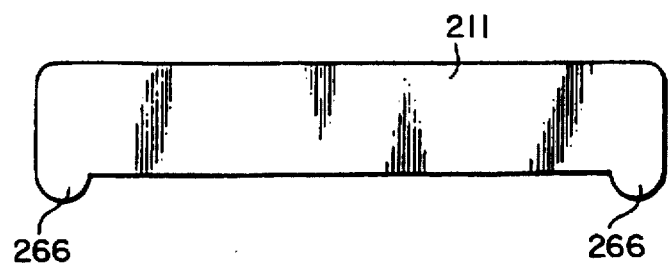
FIG. 43 is a front plan view illustrating another example of an engaging portion disposed in the disk drive unit according to the thirteenth embodiment of the present invention.
Figure 44:
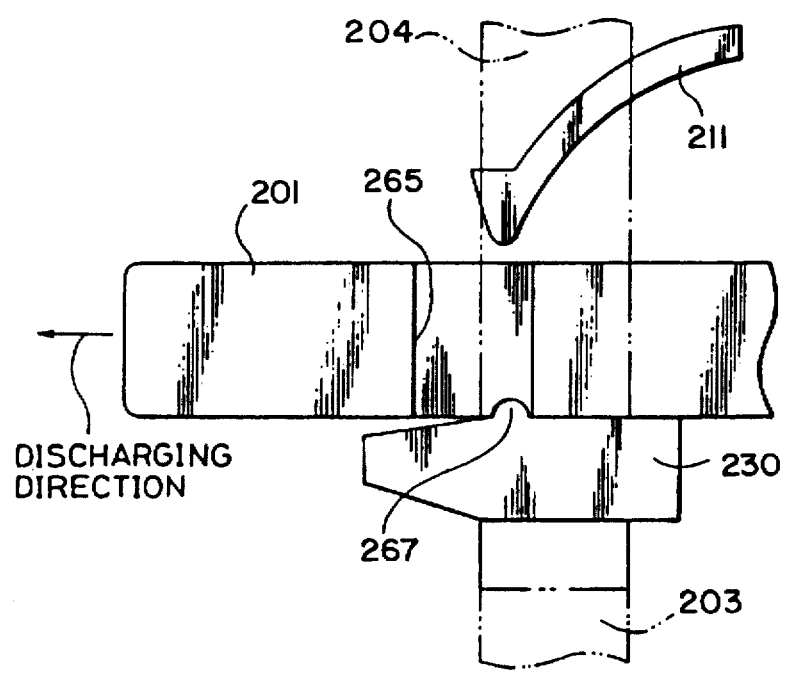
FIG. 44 is an explanatory view illustrating another example of the engaging portion disposed in the disk drive unit in FIG. 42.

FIG. 43 illustrates a front view of the shutter body having projecting portions 266 disposed at an end portion of the shutter body 211. Further, as shown in FIG. 44, a projection 267 may be disposed in the vicinity of the opening portion 204 of the chassis portion 230.

Figure 45A:
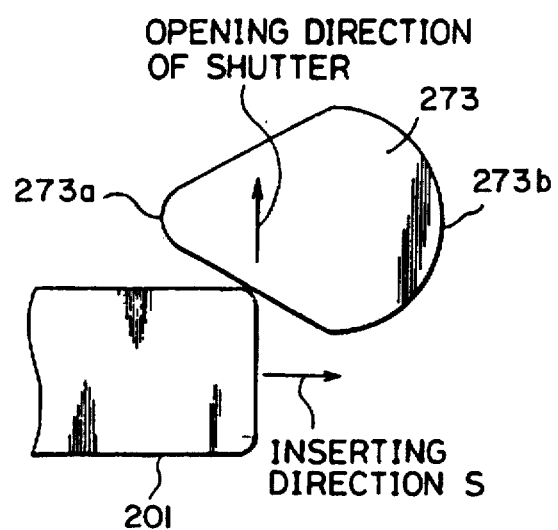
FIGS. 45a and 45b are explanatory views illustrating a modified example of a second pin constituting the engaging portion.
Figure 45B:
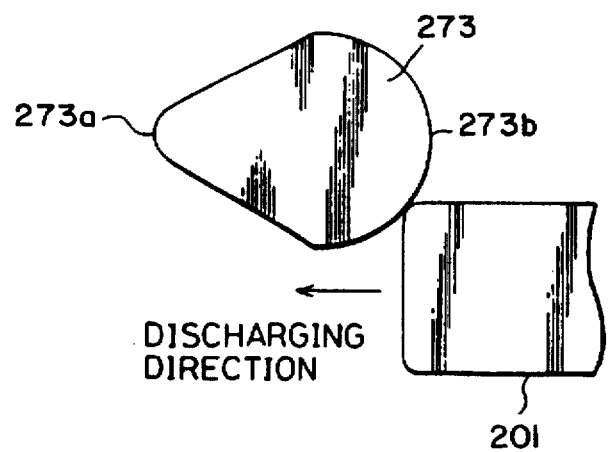

Referring to FIGS. 45a and 45b, the above described second pin 236 may be constructed by a pin 273 having a face shaped similar to that seen in FIGS. 45a and 45b. More particularly, an angle formed between an inserting direction "S" of the disk cartridge 201 and a pin face 273a on an inserting side thereof is set to be smaller than an angle formed between the inserting direction "S" of the disk cartridge 201 and a pin face 273b opposite to the pin face 273a. In this case, the disk cartridge 201 is easily inserted at the cartridge inserting time, seen in FIG. 45a, and is easily stopped at the cartridge discharging time, seen in FIG. 45b.

Figure 46:
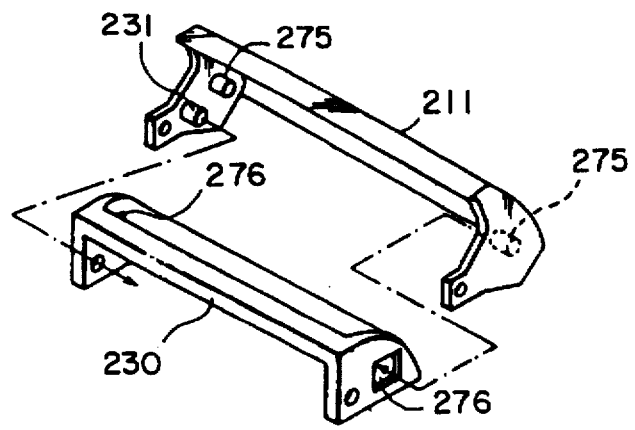
FIG. 46 is a perspective view of a portion of the shutter mechanism of the disk drive unit in accordance with a fourteenth embodiment of the present invention.

Referring to FIGS. 46 and 47 a fourteenth embodiment of the shutter mechanism is shown. In this embodiment, a contact portion 275 is inwardly projected from an inner wall of the shutter body 211 through a through hole 276 disposed in a chassis portion 230. When a disk cartridge 201 is mounted to the motor 206, seen in FIG. 21, the contact portion 275 is pushed down by a lower portion of the disk cartridge 201.

Figure 47A:
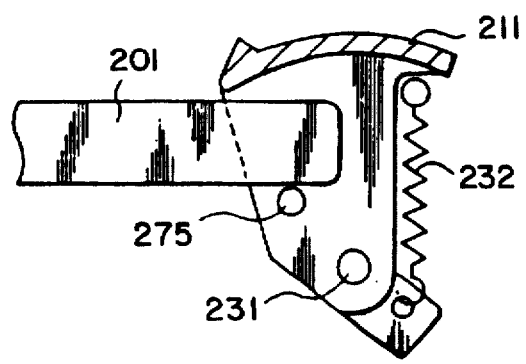
FIGS. 47a and 47b are side elevational views for explaining the operation of the shutter mechanism of FIG. 46.
Figure 47B:
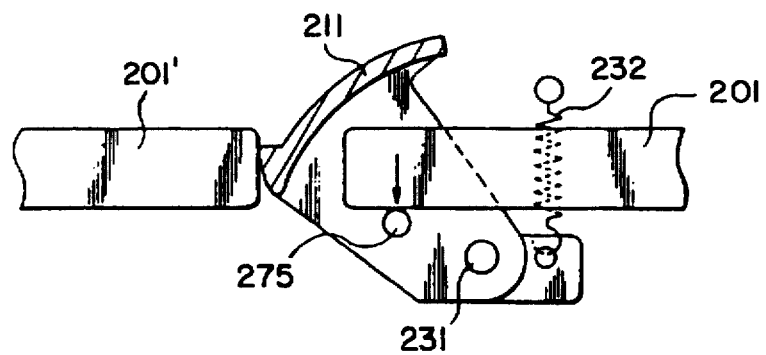

Referring to FIG. 47a, when the disk cartridge 201 is inserted, the contact portion 275 is located in a position in which no inserting operation of the disk cartridge 201 is influenced by the contact portion 275. When the disk cartridge 201 is mounted to the motor 206, as seen in FIG. 21, the contact portion 275 comes in contact with the disk cartridge 201. Therefore, if another disk cartridge 1' is inserted into the disk drive unit in an operating state thereof, as shown in FIG. 47b, the shutter body 211 cannot be opened, since movement of the contact portion 275 is restricted by the cartridge already positioned therein. The contact portion 275 may be constructed using the support shaft 231, seen in FIG. 27 and described above.

Figure 48:
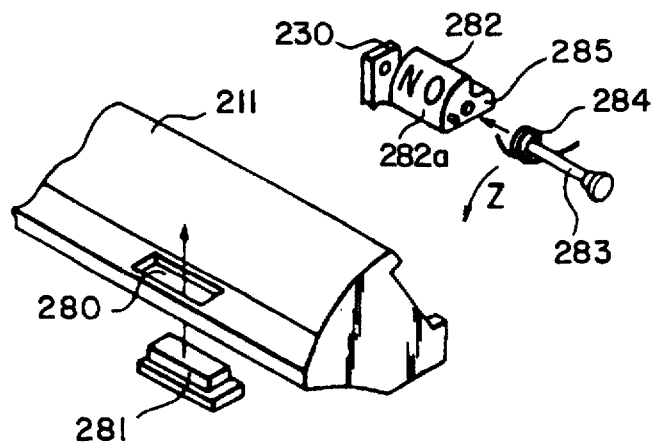
FIG. 48 is a perspective view with parts separated of the shutter mechanism of the disk drive unit in accordance with a fifteenth embodiment of the present invention.

Referring now to FIGS. 48 and 49, a fifteenth embodiment of the shutter mechanism is shown. In this embodiment, a hole 280 is disposed in a front face portion of the shutter body 211. A transparent member 281 is provided as a display window and is fixedly disposed in hole 280 such that the interior of the disk drive unit can be seen from the exterior thereof. A display face 282a of a rotatable display body 282 is arranged in a position opposite to the transparent member 281 in which no insertion of an optical disk cartridge 201 is influenced by rotation of the display body 282 at a closing time of the shutter body 211. The display body 282 is supported by a support shaft 283 supported by a chassis portion 230. The display body 282 is biased by a torsional spring 284 so that the display body is rotated in a Z-direction, seen in FIG. 48. An operating projection 285 is formed on one side of the display body 282 and comes in contact with the disk cartridge 201. The display face 282a may have characters such as "NO" indicating that a disk cartridge 201 is already mounted to the internal motor 206, as seen in FIG. 21. Otherwise, the display face 282a may be colored with a color, such as red, which is different from that of a peripheral member.

Figure 49A:
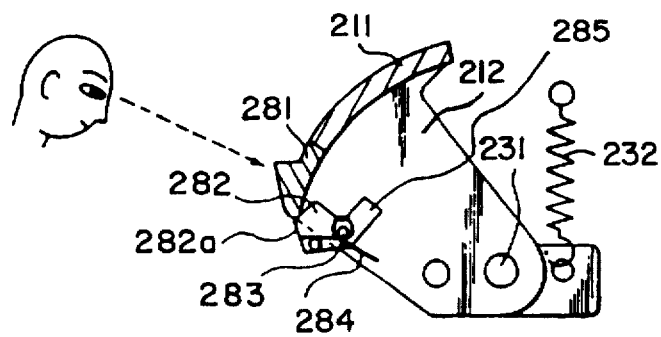
FIGS. 49a and 49b are views for explaining the operation of the shutter mechanism of FIG. 48.
Figure 49B:
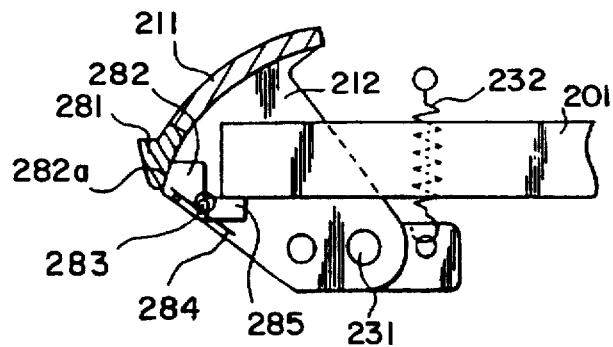

Referring to FIG. 49a, the display body 282 is biased by the torsional spring 284 such that a surface of the display body 282 is directed downward in a state in which indicates that no disk cartridge 201 is mounted. Accordingly, a user cannot see the display face 282a in this state. In FIG. 49b, the operating projection 285 is pushed down by an end portion of the disk cartridge 201 in a state in which the disk cartridge is inserted and mounted to the motor 206. Thus, the display body 282 is rotated against resilient force of the torsional spring 284 in the clockwise direction around the support shaft 283. As a result, the display face 282a faces the transparent member 281 and the user can see the display face 282a through the transparent member 281. As noted, the display face provides the user with an indication that a disk cartridge 201 is already mounted to the motor 206. Accordingly, a mounting operation of the optical disk cartridge 201 is displayed without using electrical indications, such as light emitting diodes (LED). When the shutter body 211 is constructed by a transparent member, it is possible to know a mounting state of the disk cartridge 201 from the exterior of the disk drive unit even when the display body 282 and a member relating to the display body 282 are not disposed.

Figure 50A:
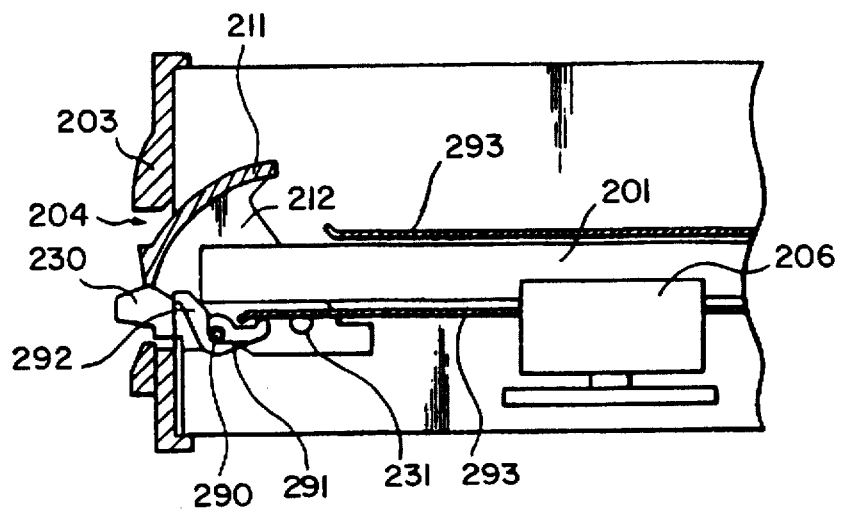
FIGS. 50a and 50b are side elevational views in partial cross-section of the disk drive unit in accordance with an sixteenth embodiment of the present invention.
Figure 50B:
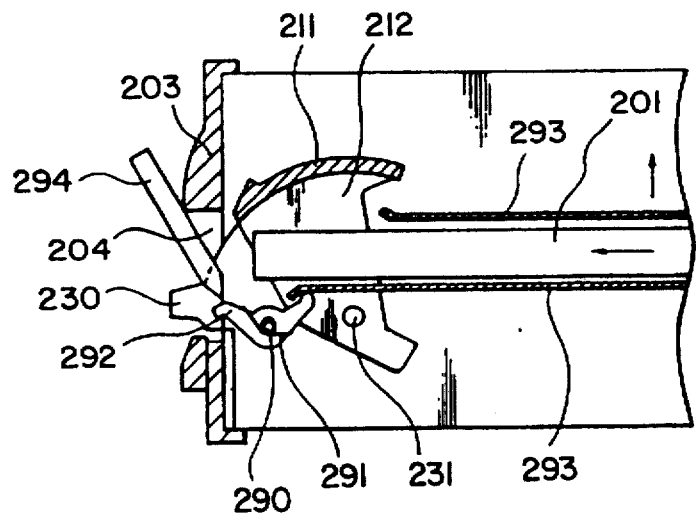

Referring now to FIGS. 50a and 50b a sixteenth embodiment of the shutter mechanism is shown. In this embodiment, an operating lever body 292 is rotatably supported by a shaft 290 in chassis portion 230 and is located below shutter body 211. The operating lever body 292 is biased by a torsional spring 291 in the counterclockwise direction. A left-hand end portion of this operating lever body 292 is located in a portion of the above opening portion 204. A right-hand end portion of the operating lever body 292 comes in contact with the lower side of a carrier 293 disposed in the loading mechanism of disk cartridge 201.

In the event the motor 206 cannot be activated, because of, for example, a loss of electric power, and a disk cartridge is installed in the drive unit, as shown in FIG. 50a, the shutter body 211 can still be manually opened and the cartridge removed from the disk drive unit. To remove the cartridge, the left-hand end portion of the operating lever body 292 is pushed by, for example a jig 294 having a sharp end, as shown in FIG. 50b. As a result, the operating lever body 292 is rotated in the counter-clockwise direction and the right-hand end portion of the operating lever body 292 pushes the lower side of the carrier 293 of the loading mechanism upwards so that the carrier 293 is moved upwards. It is then possible to discharge the disk cartridge 201 from the disk drive unit by a latch portion and a lever disposed in the loading mechanism (not shown).

Figure 51:
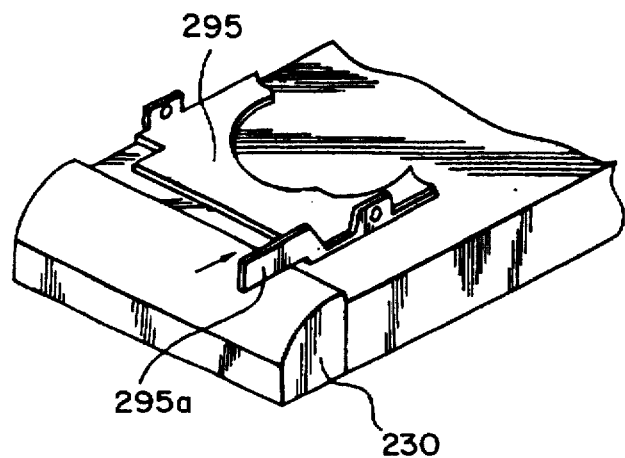

Referring to FIG. 51, a alternative embodiment of the shutter mechanism is shown for removing the cartridge when the motor 206 cannot be activated. In this embodiment, a portion 295a of a carrier 295 in the loading mechanism is extended to a position near the opening portion 204 of the case body 203. As mentioned above, the shutter body 211 can be opened when motor 206 cannot be activated. The portion 295a of the carrier 295 is then pushed inward so that the disk cartridge 201 can be discharged from the disk drive unit by a discharging operation similar to that described in the above sixteenth embodiment.

Figure 52:
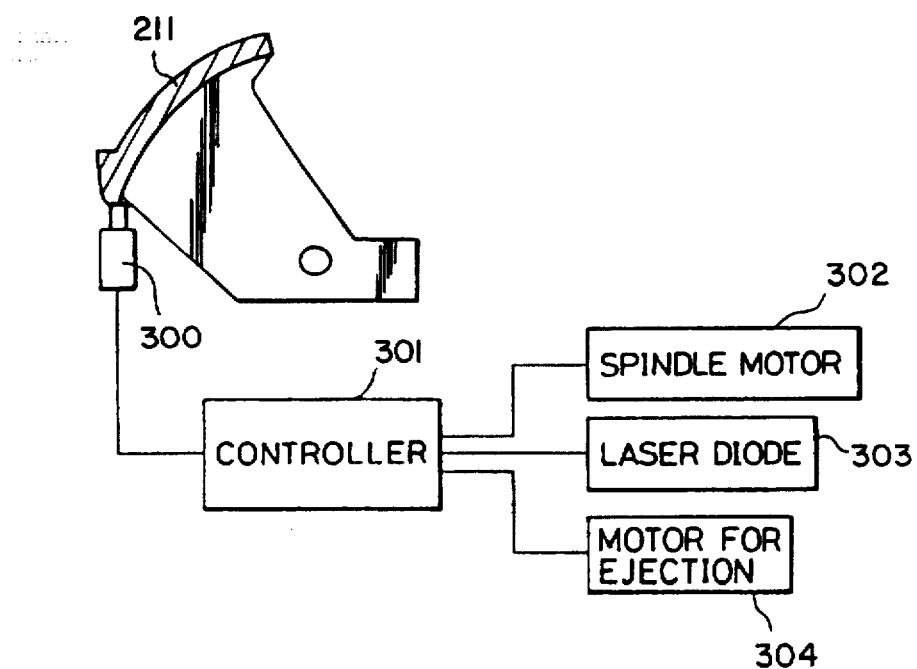
FIG. 52 is a view for explaining the shutter mechanism of the disk drive unit in accordance with a seventeenth embodiment of the present invention.
Figure 53:
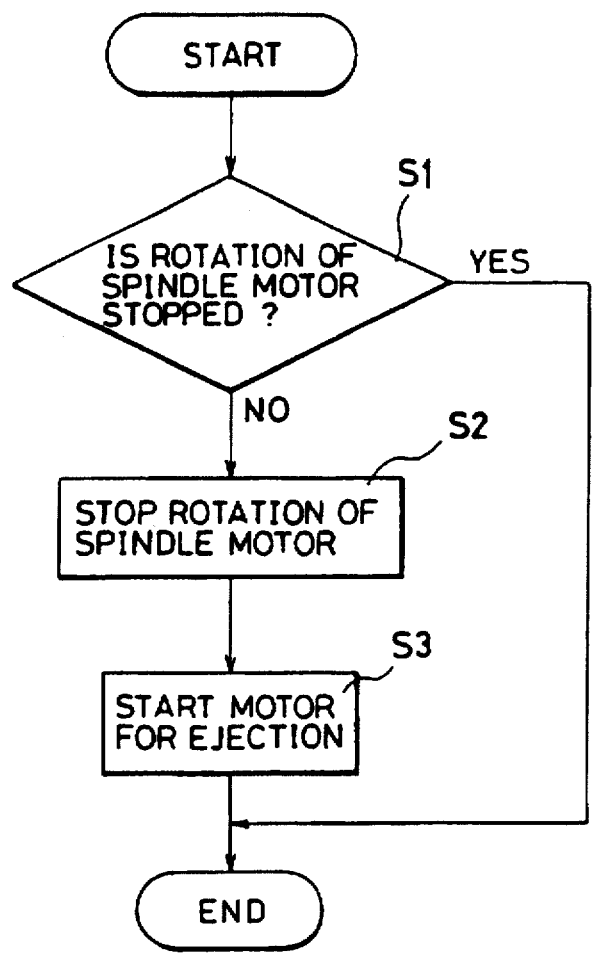
FIG. 53 is a flow chart of a control operation of shutter mechanism of the disk drive of FIG. 52.

Referring to FIGS. 52 and 53 seventeenth embodiment of the shutter mechanism of the present invention is shown. In this embodiment, a switch 300 is engaged with a lower end portion of the shutter body 211. The switch 300 transmits an electric signal indicative of an opening state of the shutter body 211 to a controller 301 when there is no stoppage of electric power. The controller 301 receiving the electric signal transmits a control signal to a spindle motor 302, as a driving member, a laser diode 303 and a motor 304 for ejection.

When a disk cartridge 201 is discharged from the disk drive unit in an emergency, the switch 300 is turned on by opening the shutter body 211. As shown by the flow chart in FIG. 53, a rotation of the spindle motor 302 in a step S1 is stopped by an operation of the controller 301 since a judgment in a step S2 is NO. Simultaneously, the laser diode 303 is turned off. Further, the motor 304 for ejection is started in a step S3 to discharge the optical disk cartridge 1 from the optical disk drive unit.

Many widely different embodiments of the present invention may be constructed without departing from the spirit and scope of the present invention. It should be understood that the present invention is not limited to the specific embodiments described in the specification, except as defined in the appended claims.

What is claimed is:

1. A disk drive unit comprising;

a body case;

an opening portion formed in said body case for inserting a disk cartridge into said body case and taking said cartridge out of said body case, said cartridge having a disk therein;

a shutter supported rotatably in said body case for opening and closing said opening portion, said shutter closing said opening portion except when said cartridge is inserted or ejected, said shutter rotating upwardly by coming into contact with said cartridge to open said opening portion when said cartridge is inserted, said shutter includes a supporting member at a side end thereof and a sliding portion at an outer face thereof, said supporting member being linked with said body case and rotatably supporting said shutter, said sliding portion being inclined with respect to an inserting direction of said cartridge coming in contact with an inserting side edge portion of said cartridge inserted into a set position within said body case and sliding against said inserting side edge portion of said cartridge so as to open said shutter;

a driving device fixed to said body case and configured to receive said cartridge inserted through said opening portion and to rotate said disk in said cartridge;

a loading device configured to vertically move said cartridge so as to load said inserted cartridge onto said driving device and so as to selectively eject said cartridge in an ejection movement; and a cam linked with said shutter, for rotating said shutter upwardly in association with said ejection movement of said cartridge caused by said loading device thereby to open said opening portion when said cartridge is being ejected, said cam includes a contact member and an operating rod, said contact member coming in contact with said cartridge while inserting into said body case, said operating rod supporting said contact member at one end thereof and being connected to said supporting member at another end thereof and rotating said supporting member such that said shutter is moved to a closing position in accordance with movement of said cartridge from said set position to a recording/reproducing position and that said shutter is moved to an opening position in accordance with movement of said cartridge from said recording/reproducing position to said set position, and said operating rod holding said supporting member in such a manner that said shutter is located in said opening position when said cartridge is inserted into or ejected from said disk drive unit.

2. A disk drive unit according to claim 1, wherein said contact member has a guide portion inclined with respect to said inserting direction of said cartridge, and said guide portion is slides against said inserting side edge portion of said cartridge so as to guide said contact member to a contact position with said cartridge when said cartridge is inserted into said set position.

3. A disk drive unit according to claim 2, wherein said sliding portion is formed in a convex shape extending in a sliding direction thereof.

4. A disk drive unit according to claim 2, wherein said sliding portion is inclined with respect to said inserting direction of said cartridge when said shutter is located in a position between said closing position and said opening position.

5. A disk drive unit according to claim 2, wherein an inlet forming face of said body case forming said opening portion is formed by a curved surface having a first curvature, an inner face of said shutter opposite to said inlet forming face is formed by a curved surface having a second curvature around a rotating central of said supporting member and said second curvature having a longer radius that said first curvature, and a rotating center of said supporting member is positioned such that a portion of said shutter inner face near a lower end thereof comes in contact with said inlet forming face in said closing position of said shutter.

6. A disk drive unit according to claim 2, wherein said guide portion is formed in a convex shape extending in a sliding direction thereof.

7. A disk drive unit according to claim 6, wherein said sliding portion is formed in a convex shape extending in a sliding direction thereof.

8. A disk drive unit according to claim 7, wherein the coefficients of thermal expansion of said shutter, said supporting member and at least a portion of said body case near said inlet forming face are approximately equal to each other.

9. A disk drive unit according to claim 6, wherein said sliding portion is inclined with respect to said inserting direction of said cartridge when said shutter is located in a position between said closing position and said opening position.

10. A disk drive unit according to 6, wherein an inlet forming face of said body case forming said opening portion is formed by a curved surface having a first curvature, an inner face of said shutter opposite to said inlet forming face is formed by a curved surface having a second curvature around a rotating central of said supporting member and said second curvature having a longer radius that said first curvature, and a rotating center of said supporting member is positioned such that a portion of said shutter inner face near a lower end thereof comes in contact with said inlet forming face in said closing position of said shutter.

11. A disk drive unit according to claim 1, wherein said sliding portion is formed in a convex shape extending in a sliding direction thereof.

12. A disk drive unit according to claim 1, wherein said sliding portion is inclined with respect to said inserting direction of said cartridge when said shutter is located in a position between said closing position and said opening position.

13. A disk drive unit according to claim 1, wherein an inlet forming face of said body case forming said opening portion is formed by a curved surface having a first curvature, an inner face of said shutter opposite to said inlet forming face is formed by a curved surface having a second curvature around a rotating central of said supporting member and said second curvature having a longer radius that said first curvature, and a rotating center of said supporting member is positioned such that a portion of said shutter inner face near a lower end thereof comes in contact with said inlet forming face in said closing position of said shutter.

14. A disk drive unit according to claim 1, wherein said contact member has a surface inclined with respect to said inserting direction of said cartridge, and said inclined surface is slides against said inserting side edge portion of said cartridge so as to guide said contact member to a contact position with said cartridge when said cartridge is inserted into said setting position.

15. A disk drive unit comprising;
a body case;
an opening portion formed in said body case for inserting a disk cartridge into said body case and taking said cartridge out of said body case, said cartridge having a disk therein;
a shutter supported rotatably in said body case for opening and closing said opening portion, said shutter closing said opening portion except when said cartridge is inserted or ejected, said shutter rotating upwardly by coming into contact with said cartridge to open said opening portion when said cartridge is inserted;
a driving device fixed to said body case and configured to receive said cartridge inserted through said opening portion and to rotate said disk in said cartridge;
a loading device configured to vertically move said cartridge so as to load said inserted cartridge onto said driving device and so as to selectively eject said cartridge in an ejection movement;
a cam linked with said shutter, for rotating said shutter upwardly in association with said ejection movement of said cartridge caused by said loading device thereby to open said opening portion when said cartridge is being ejected; and
a spring for biasing said shutter toward an opening direction of said shutter during an opening operation of said shutter by said cam.

16. A disk drive unit comprising;
a body case;
an opening portion formed in said body case for inserting a disk cartridge into said body case and taking said cartridge out of said body case, said cartridge having a disk therein;
a shutter supported rotatably in said body case for opening and closing said opening portion, said shutter closing said opening portion except when said cartridge is inserted or ejected, said shutter rotating upwardly by coming into contact with said cartridge to open said opening portion when said cartridge is inserted, and said shutter includes a supporting member at a side end thereof, said supporting member being linked with said body case and rotatably supporting said shutter;
a driving device fixed to said body case and configured to receive said cartridge inserted through said opening portion and to rotate said disk in said cartridge;
a loading device configured to vertically move said cartridge so as to load said inserted cartridge onto said driving device and so as to selectively eject said cartridge in an ejection movement; and
a cam linked with said shutter, for rotating said shutter upwardly in association with said ejection movement of said cartridge caused by said loading device thereby to open said opening portion when said cartridge is being ejected, said cam includes a contact member and an operating rod, said contact member coming in contact with said cartridge while inserting into said body case, said operating rod supporting said contact member at one end thereof and being connected to said supporting member at another end thereof and rotating said supporting member such that said shutter is moved to a closing position in accordance with movement of said cartridge from a set position to a recording/reproducing position and that said shutter is moved to an opening position in accordance with movement of said cartridge from said recording/reproducing position to said set position, and said operating rod holding said supporting member in such a manner that said shutter is located in said opening position when said cartridge is inserted into or ejected from said disk drive unit.

* * * * *

UNITED STATES PATENT AND TRADEMARK OFFICE
CERTIFICATE OF CORRECTION

PATENT NO. : 5,787,063
DATED : July 28, 1998
INVENTOR(S) : Tetsuo KANNO, et al.

It is certified that error appears in the above-identified patent and that said Letters Patent is hereby corrected as shown below:

On the title page, under Item [73]:

Change "Richoh Company, Ltd., Tokyo, Japan"

to --Ricoh Company, Ltd., Tokyo, Japan--

Signed and Sealed this

Third Day of November, 1998

*Attest:*

BRUCE LEHMAN

*Attesting Officer*     *Commissioner of Patents and Trademarks*